(12) United States Patent
Watanabe et al.

(10) Patent No.: US 11,634,202 B2
(45) Date of Patent: Apr. 25, 2023

(54) COOLING DEVICE FOR POWER SOURCE FOR SHIP PROPULSION DEVICE

(71) Applicant: SUZUKI MOTOR CORPORATION, Hamamatsu (JP)

(72) Inventors: Toshio Watanabe, Hamamatsu (JP); Jun Ito, Hamamatsu (JP); Shingo Matsumoto, Hamamatsu (JP); Yudai Atsumi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 65 days.

(21) Appl. No.: 17/328,537

(22) Filed: May 24, 2021

(65) Prior Publication Data

US 2021/0380213 A1   Dec. 9, 2021

(30) Foreign Application Priority Data

Jun. 5, 2020   (JP) .............................. JP2020-098484

(51) Int. Cl.

| | |
|---|---|
| *B63H 20/28* | (2006.01) |
| *F01P 5/10* | (2006.01) |
| *F01P 7/14* | (2006.01) |
| *F01N 3/10* | (2006.01) |
| *B01D 35/147* | (2006.01) |
| *B01D 35/22* | (2006.01) |
| *C02F 1/00* | (2023.01) |

(Continued)

(52) U.S. Cl.
CPC ......... *B63H 20/285* (2013.01); *B01D 35/147* (2013.01); *B01D 35/1435* (2013.01); *B01D 35/22* (2013.01); *C02F 1/001* (2013.01); *F01N 3/10* (2013.01); *F01P 5/10* (2013.01); *F01P 7/14* (2013.01); *B01D 2201/165* (2013.01); *C02F 2103/023* (2013.01); *C02F 2201/005* (2013.01); *C02F 2201/006* (2013.01); *C02F 2201/008* (2013.01); *F01P 2007/146* (2013.01)

(58) Field of Classification Search
CPC .. B01D 35/22; B01D 35/147; B01D 35/1435; B01D 20/285; B01D 2201/165
See application file for complete search history.

(56) References Cited

U.S. PATENT DOCUMENTS 10,092,863 B1 * 10/2018 George ................... B63H 20/28
10,233,818 B1 *  3/2019 Reichardt ............... F01P 3/202
(Continued)

FOREIGN PATENT DOCUMENTS

| JP | 61-184198 A | 8/1986 |
| JP | 2003-63497 A | 3/2003 |

*Primary Examiner* — Kevin A Lathers
(74) *Attorney, Agent, or Firm* — Stein IP, LLC

(57) ABSTRACT

The cooling device for a power source for a ship propulsion device that pumps up cooling water, from which foreign matters with sizes that cause clogging of a cooling water route have been removed, supplies the cooling water to a cooling water passage (30), and discharges the cooling water to outside after cooling a power source (10) includes: a cartridge-type filtration device (40, 73) that is provided at a midpoint of a first water passage (36, 71) in the cooling water route and incorporates a filter (45, 46) for filtrating foreign matters remaining in the cooling water; and a second water passage (38, 72) that is branched from the first water passage and adapted such that a valve member (53) is opened to cause the cooling water to flow in a case in which clogging occurs in the filter.

8 Claims, 9 Drawing Sheets

(51) Int. Cl.
  *B01D 35/143* (2006.01)
  *C02F 103/02* (2006.01)

(56) References Cited

U.S. PATENT DOCUMENTS

| | | | |
|---|---|---|---|
| 11,377,997 B2* | 7/2022 | Watanabe | F01P 11/18 |
| 11,383,810 B2* | 7/2022 | Watanabe | B01D 35/1435 |
| 2003/0040231 A1 | 2/2003 | Matsuda et al. | 440/39 |

* cited by examiner

FLOW OF WATER PASSING THROUGH RELAY PIPE 56

COOLING DEVICE FOR POWER SOURCE FOR SHIP PROPULSION DEVICE

CROSS-REFERENCE TO RELATED APPLICATIONS

This application claims the benefit of Japanese Application No. 2020-098484, filed Jun. 5, 2020, in the Japanese Patent Office. All disclosures of the document named above are incorporated herein by reference.

BACKGROUND OF THE INVENTION

Field of the Invention

The present invention relates to a cooling device for a power source for a ship propulsion device.

Description of the Related Art

In recent years, contamination of water areas such as oceans, lakes, and rivers due to trash has been a serious environmental problem, and measures for collecting trash from water areas have been required. In general, it is more difficult to collect smaller trash. Particularly, it is difficult to capture fine microplastics (with sizes of 5 mm or less, for example), microplastics have large influences on aquatic life and large loads on the environment. Therefore, it has been desired to actively collect the microplastics.

Cooling devices of a water cooling type to cool engines and electric motors, which are power sources for ship propulsion devices, take water pumped up from underwater into cooling water passages, use the water as cooling water, and discharge the cooling water after cooling heat generating parts of the power sources to the outside. However, existing cooling devices are adapted just to return the cooling water pumped up once to the outside as it is, and a viewpoint (environmental measure) of purifying the pumped cooling water has been missed.

According to a cooling device for a power source for a ship propulsion device, a porous strainer or the like that serves as a trash removal means is provided at or near an inlet port through which cooling water is taken from the outside (Japanese Patent Laid-Open No. 61-184198, for example), such that large trash such as caps of PET bottles is prevented from entering a cooling water passage by the strainer. However, there is a high likelihood that fine foreign matters with sizes (of about 1 mm to 2 mm, for example) below the size of a strainer mesh are taken into the cooling water passage as they are without being removed, depending on the strainer. Therefore, opportunities for purification have been missed without capturing microplastics and the like that are difficult to be collected.

Also, there are examples in which a filter is provided in a cooling water passage as in Japanese Patent Laid-Open No. 2003-63497, but an object of the filter is to remove relatively large foreign matters such as pebbles and algae, and the filter has functions similar to those of the strainer according to Japanese Patent Laid-Open No. 61-184198.

As described above, there have been no viewpoints of actively carrying out environmental measures on cooling water that cooling devices for power sources for ship propulsion devices in the related art take from outside. With a configuration in which a strainer is provided at an inlet port as in Japanese Patent Laid-Open No. 61-184198, for example, fine objects that have passed through the strainer are not collected and return to water again even if passing of such fine objects is regulated by making the mesh of the strainer finer.

Even if environment contaminating materials in cooling water taken from the outside are captured and removed, sacrifice of power performance of the ship propulsion devices and addition of expensive and complicated devices lead to degradation of product values of the ship propulsion devices, and it is not possible to state that these are practical measures.

If clogging of a filter incorporated in a cooling water passage occurs in a cooling device as in Japanese Patent Laid-Open No. 2003-63497, for example, a flow of the cooling water is disturbed, cooling performance deteriorates, and output degradation or overheating of a power source may occur. Also, there is a concern that if the filter is just assembled in the cooling water passage, the cooling device may require extensive disassembly and maintenance when clogging of the filter occurs.

In a case in which the ship propulsion device is an outboard motor, and if the outboard motor increases in size due to addition of a device for collecting environment contaminating materials from cooling water, there is a problem that multiple-machine arrangement in which a plurality of outboard motors are disposed in an aligned manner is limited.

SUMMARY OF THE INVENTION

The present invention was made in view of such points, and provides a cooling device for a water source for a ship propulsion device capable of collecting environment contaminating materials such as microplastics that are present in water and efficiently removing the environment contaminating material with a simple configuration with no sacrifice of power performance.

According to the present invention, there is provided a cooling device for a power source for a ship propulsion device including: a cooling water route that supplies water pumped up from underwater to a cooling water passage to cool a power source and discharges cooling water after the cooling from the cooling water passage to outside, foreign matters with sizes that cause clogging of the cooling water route having been removed from the cooling water flowing through the cooling water route; a cartridge-type filtration device that is provided at a midpoint of a first water passage in the cooling water route and incorporates a filter for filtrating foreign matters remaining in the cooling water; and a second water passage that is branched from the first water passage and adapted such that a valve member is opened to cause the cooling water to flow in a case in which clogging occurs in the filter.

According to the cooling device for a power source for a ship propulsion device of the present invention, it is possible to collect environment contaminating materials such as microplastics that are present in water and to efficiently remove the environment contaminating materials, with a simple configuration with no sacrifice of power performance.

The present disclosure relates to subject matter contained in Japanese Patent Application No. 2020-098484 (filed on Jun. 5, 2020) which is expressly incorporated herein by reference in its entirety.

DETAILED DESCRIPTION OF THE PREFERRED EMBODIMENTS

Figure 8:
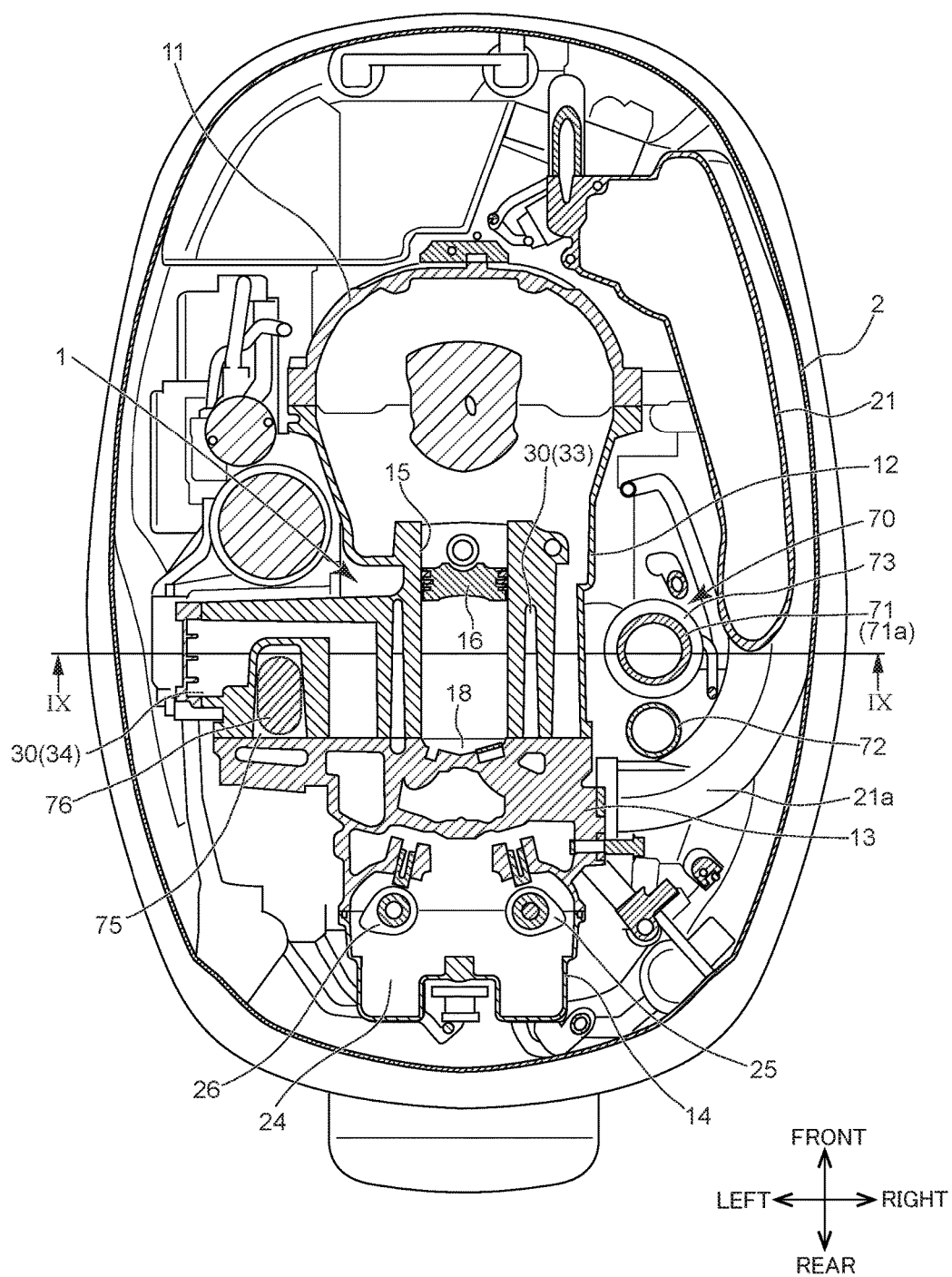
FIG. 8 is a sectional view illustrating a modification example of the engine and the cooling device for an outboard motor.
Figure 9:
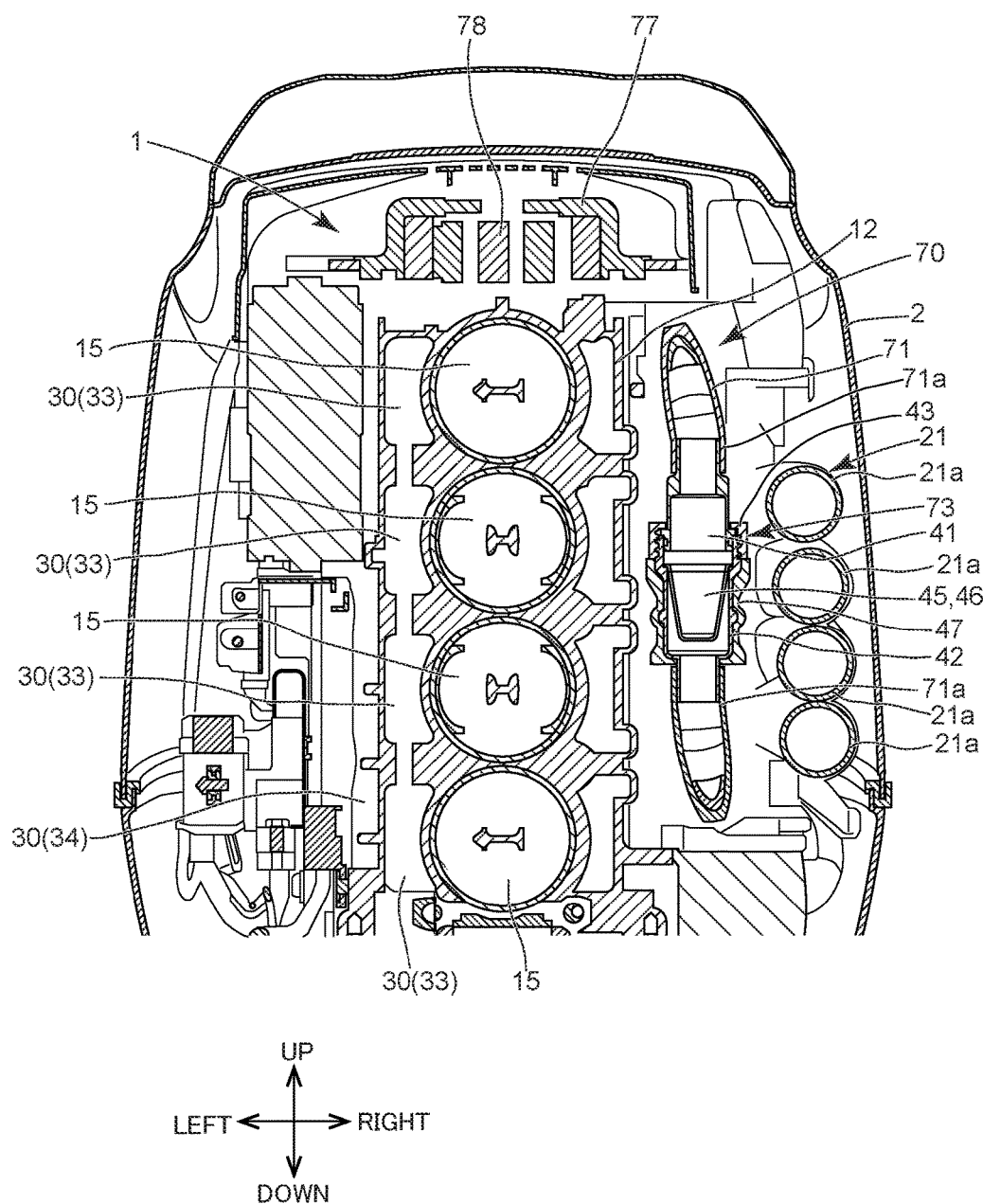
FIG. 9 is a sectional view taken along the line IX-IX in FIG. 8.

Hereinafter, an embodiment of the present invention will be described with reference to the accompanying drawings. The present invention is applied to an outboard motor that is an example of a ship propulsion device, FIGS. 1 to 7 illustrate a form of an application to the outboard motor, and FIGS. 8 and 9 illustrate modification examples. Each of front, back, left, right, up, and down in the following description indicates each direction from a ship body of a ship to which the outboard motor is attached. The left-right direction is a transverse width direction of the outboard motor. Note that although the orientation of the outboard motor relative to the ship body changes due to swinging around a steering axis or swinging around a tilt axis, each direction will be described below on the assumption that the outboard motor is at a constant location (a location in an initial state with no swinging due to steering or tilting).

An engine 1 is included as a power source for the outboard motor, and the engine 1 is attached to an engine room inside an engine case 2 (partially illustrated in FIGS. 3 and 5) configuring the exterior of the outboard motor. Although illustration of power systems other than the engine 1 in the outboard motor is omitted, a drive shaft which is driven and rotated by a force generated by the engine 1 extends in the up-down direction, a propeller shaft to which the rotation is transmitted from the drive shaft extends in the front-back direction, and a propulsion force is generated through rotation of a propeller attached to the propeller shaft.

The outboard motor roughly includes an upper unit including the engine 1, a lower unit including the propeller and the propeller shaft, and an intermediate unit placed between the upper unit and the lower unit. The lower unit is located below a water level in an ordinary cruising state. The drive shaft is caused to pass inside the intermediate unit and connects a crankshaft 10 (see FIGS. 3 and 5) on the side of the upper unit and the propeller shaft (not illustrated) on the side of the lower unit. The lower unit is provided with a gear that transmits power from the drive shaft to the propeller shaft, and a gear case (not illustrated) surrounding the gear configures the exterior of the lower unit.

Figure 3:
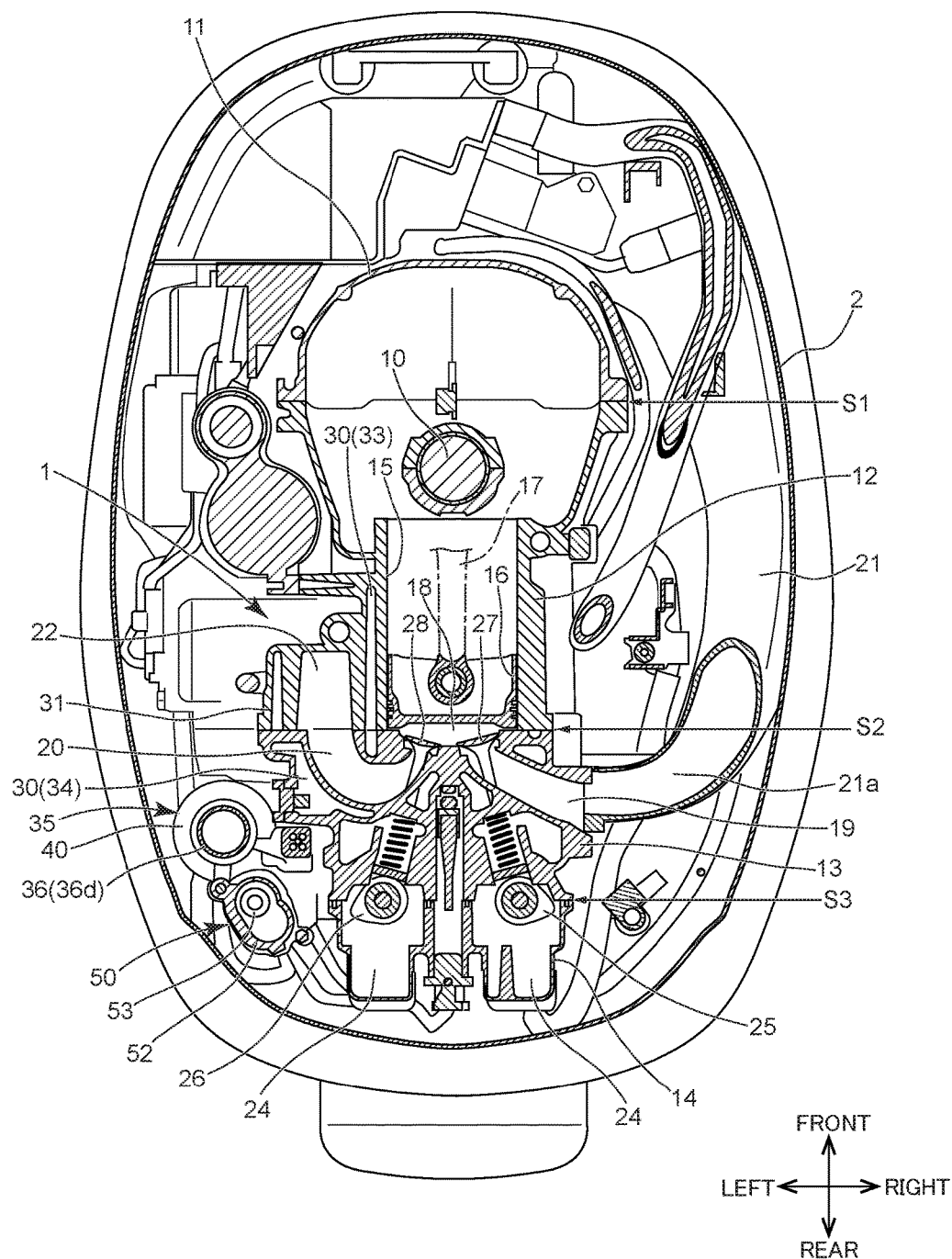
FIG. 3 is a sectional view taken along the line III-Ill in FIG. 2.
Figure 5:
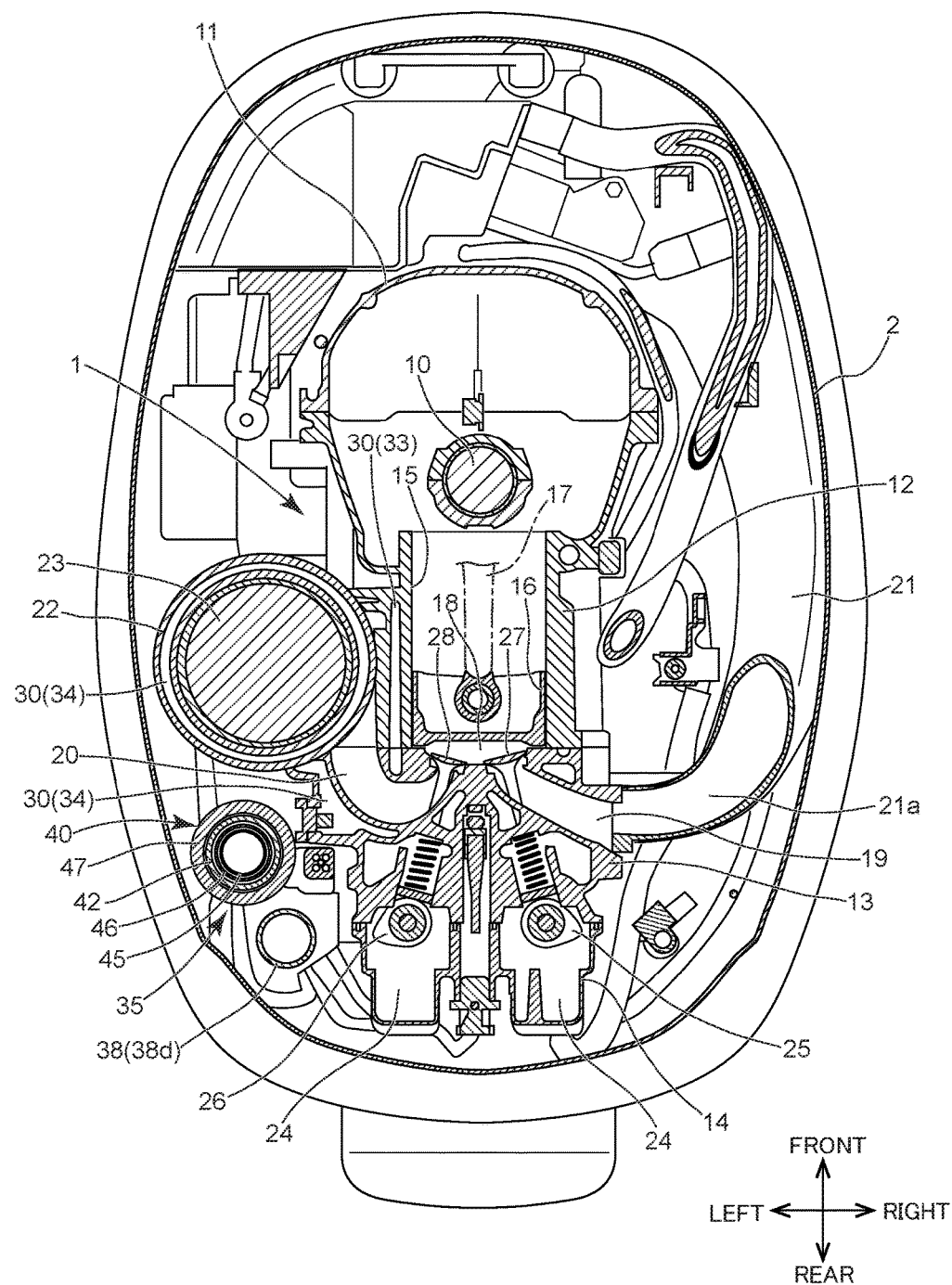
FIG. 5 is a sectional view taken along the line V-V in FIG. 4.

As illustrated in FIGS. 3 and 5, the engine 1 includes a crankcase 11, a cylinder block 12, a cylinder head 13, and a head cover 14 as a relation aligned in order from the front side. The positions of a mating surface 51 that is a boundary between the crankcase 11 and the cylinder block 12, a mating surface S2 that is a boundary between the cylinder block 12 and the cylinder head 13, and a mating surface S3 that is a boundary between the cylinder head 13 and the head cover 14 are illustrated in FIG. 3. The crankshaft 10 extending in the up-down direction is provided in a crank chamber formed between the crankcase 11 and the cylinder block 12.

Tubular cylinders 15 are formed inside the cylinder block 12. The plurality of cylinders 15 are provided at different positions in the up-down direction. In other words, the engine 1 is a multi-cylinder engine in which the cylinders 15 are aligned in the up-down direction, and a plurality of intake and exhaust ports and valves, which will be described later, are also provided in a manner corresponding to the number of cylinders 15.

A piston 16 is inserted into each cylinder 15 such that the piston 16 can slide in the front-back direction. The piston 16 is coupled to the crankshaft 10 via a connecting rod 17. If the piston 16 moves forward and backward in the front-back direction, then the crankshaft 10 rotates. The rotation of the crankshaft 10 is transmitted to the drive shaft, and the propeller is driven and rotated via the drive shaft and the propeller shaft as described above.

The cylinder head 13 is provided with a combustion chamber 18 that communicates with each cylinder 15 and an intake port 19 and an exhaust port 20 that communicate with the combustion chamber 18. The intake port 19 extends substantially rightward relative to the combustion chamber 18, and the exhaust port 20 extends substantially leftward relative to the combustion chamber 18.

An intake manifold 21 that configures an intake conduit line for guiding air taken from outside into the intake port 19 is provided in the engine room. The intake manifold 21 extends backward from the front side of the crankcase 11 through a side (right side) of the cylinder block 12 and includes, on the side of a rear end portion, a plurality of branched pipes 21a branched in the up-down direction. Each of the plurality of branched pipes 21a is connected to a corresponding intake port 19 on an obliquely right and rear side of the cylinder block 12.

The exhaust port 20 has a curved shape extending from the combustion chamber 18 to the obliquely left and rear side and changing the direction to the obliquely left and front side at a midpoint, and a distal end portion of the exhaust port 20 (an end portion on the side opposite to the side on which the exhaust port 20 communicates with the combustion chamber 18) is connected to an exhaust manifold 22 configuring an exhaust conduit line. The exhaust manifold 22 is located on the left side of the cylinder 15 and extends in the up-down direction, and the plurality of exhaust ports 20 corresponding to the plurality of cylinders 15 are connected to the exhaust manifold 22 in a gathering manner. A catalyst 23 is disposed in the exhaust manifold 22 (see FIGS. 4 and 5). The catalyst 23 has a shape with a longitudinal direction oriented in the up-down direction along the exhaust manifold 22.

Intake camshafts 25 and exhaust camshafts 26 that are rotatable about shafts extending in the up-down direction are supported in left and right valve operating chambers 24 formed between the cylinder head 13 and the head cover 14. The intake camshafts 25 are located behind the intake port 19, and the exhaust camshafts 26 are located behind the exhaust port 20. A portion of the intake port 19 communicating with the combustion chamber 18 is opened and closed by an intake valve 27. Opening and closing of the intake valve 27 are controlled by a cam provided at the intake camshaft 25. A portion of the exhaust port 20 communicating with the combustion chamber 18 is opened and closed by an exhaust valve 28. Opening and closing of the exhaust valve 28 are controlled by a cam provided at the exhaust camshaft 26.

Air taken from the outside of the outboard motor passes through a silencer (not illustrated) and then flows into the intake port 19 through the intake manifold 21. A fuel is jetted into the intake port 19 by a fuel injector (not illustrated), and mixture gas (air-fuel mixture) is generated from the air flowing into the intake port 19 and the fuel jetted into the intake port 19. The mixture gas flows into the combustion chamber 18 through opening of the intake valve 27. Note that the engine may be of a type adapted such that the fuel is jetted from the fuel injector into the combustion chamber 18 to generate the mixture gas.

If mixture gas inside the combustion chamber 18 is ignited at a predetermined timing by an ignition plug (not illustrated), then the piston 16 is pressed and moves forward due to combustion of the mixture gas, and a force that causes the crankshaft 10 to rotate is transmitted via the connecting rod 17. Exhaust gas after combustion flows out of the combustion chamber 18 to the exhaust port 20 through opening of the exhaust valve 28 and advances to the exhaust manifold 22. The exhaust manifold 22 is connected to a lower exhaust pipe (not illustrated) extending downward from an engine room. The exhaust gas purified by the catalyst 23 inside the exhaust manifold 22 passes through the lower exhaust pipe and is then discharged from an exhaust port (not illustrated) to the outside of the outboard motor. The exhaust port is provided at the lower unit of the outboard motor, such as a rear end portion of the propeller shaft, and the exhaust gas is discharged to the underwater.

The engine 1 includes a water cooling-type cooling device. The cooling device is adapted to pump up water in the water area of cruising and use the taken water as cooling water to cool the engine 1. As illustrated in FIGS. 3 and 5, a cooling water passage 30 through which the cooling water is caused to pass is formed in the surroundings of a heat generating part of the engine 1 that reaches a high temperature. The cooling water passage 30 is configured as a water passage with a watertight structure by a water jacket 31 (FIG. 3) formed by a part of the cylinder block 12 and the cylinder head 13 and a water jacket cover 32 (FIGS. 1 and 2) attached to the water jacket 31.

An inlet-side water passage (not illustrated) for taking the cooling water from the outside of the outboard motor (underwater) and supplying the cooling water to the cooling water passage 30 and a water discharge-side water passage 35 for discharging the cooling water after cooling the engine 1 from the cooling water passage 30 to the outside are provided. The inlet-side water passage, the cooling water passage 30, and the water discharge-side water passage 35 configure the cooling water route in the cooling device. A water pump (not illustrated) driven by rotation of the drive shaft is used to pump up the cooling water from the outside via the inlet-side water passage, distribute the cooling water through the cooling water passage 30, and discharge the cooling water via the water discharge-side water passage 35.

The inlet-side water passage includes, on a most upstream side, a water inlet port (not illustrated) that is opened on an outer surface side of the outboard motor. The water inlet port is formed in an outer surface of the lower unit (an outer surface of the gear case) of the outboard motor. The water inlet port is provided with a strainer (not illustrated), and foreign matters with sizes in such a level that causes clogging of the cooling water route, such as pebbles and algae, are prevented from entering the cooling water route by the strainer. The inlet-side water passage extends from the water inlet port to the inside of the engine room and is connected to the cooling water passage 30. The cooling water taken into the inlet-side water passage from the water inlet port is suctioned and fed to the inside of the cooling water passage 30 through driving of the water pump.

Figure 4:
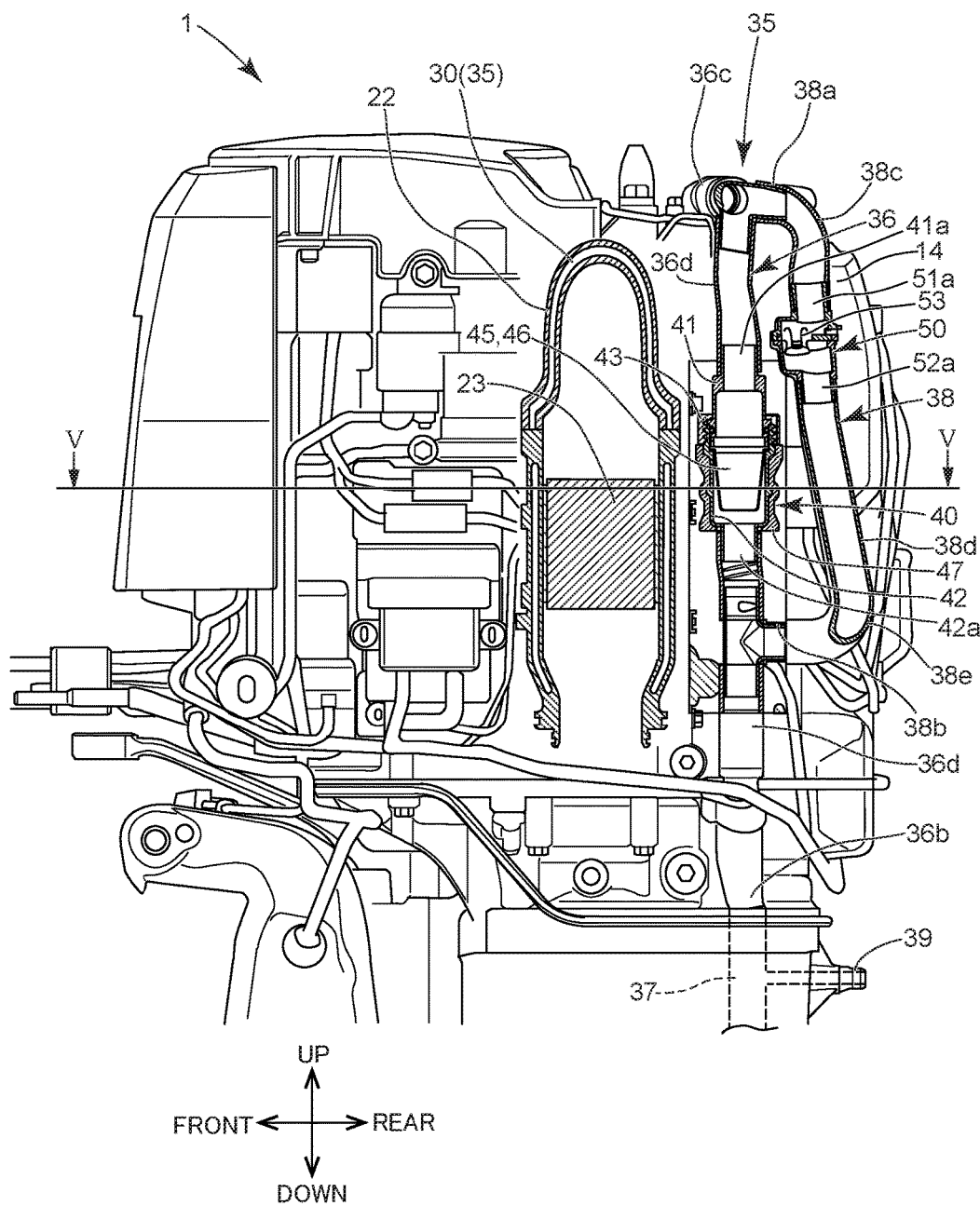
FIG. 4 is a side view illustrating, in a sectional view, a part of the cooling device and an exhaust structure in the engine and the cooling device for an outboard motor.

As illustrated in FIGS. 3 and 5, the cooling water passage 30 includes a cylinder surrounding water passage 33 formed in the surroundings of the cylinders 15 and the combustion chamber 18 and an exhaust surrounding water passage 34 formed in the surroundings of the exhaust port 20 and the exhaust manifold 22. As illustrated in FIGS. 4 and 5, the exhaust manifold 22 has a double-tube structure, the catalyst 23 is disposed inside the inner tube, and a part of the exhaust surrounding water passage 34 is formed between the outer tube and the inner tube. The cooling water supplied to the cylinder surrounding water passage 33 and the exhaust surrounding water passage 34 takes heat from and cools a portion that has reached a high temperature due to combustion of the mixture gas in the combustion chamber 18 and passing of the exhaust gas after combustion.

Figure 1:
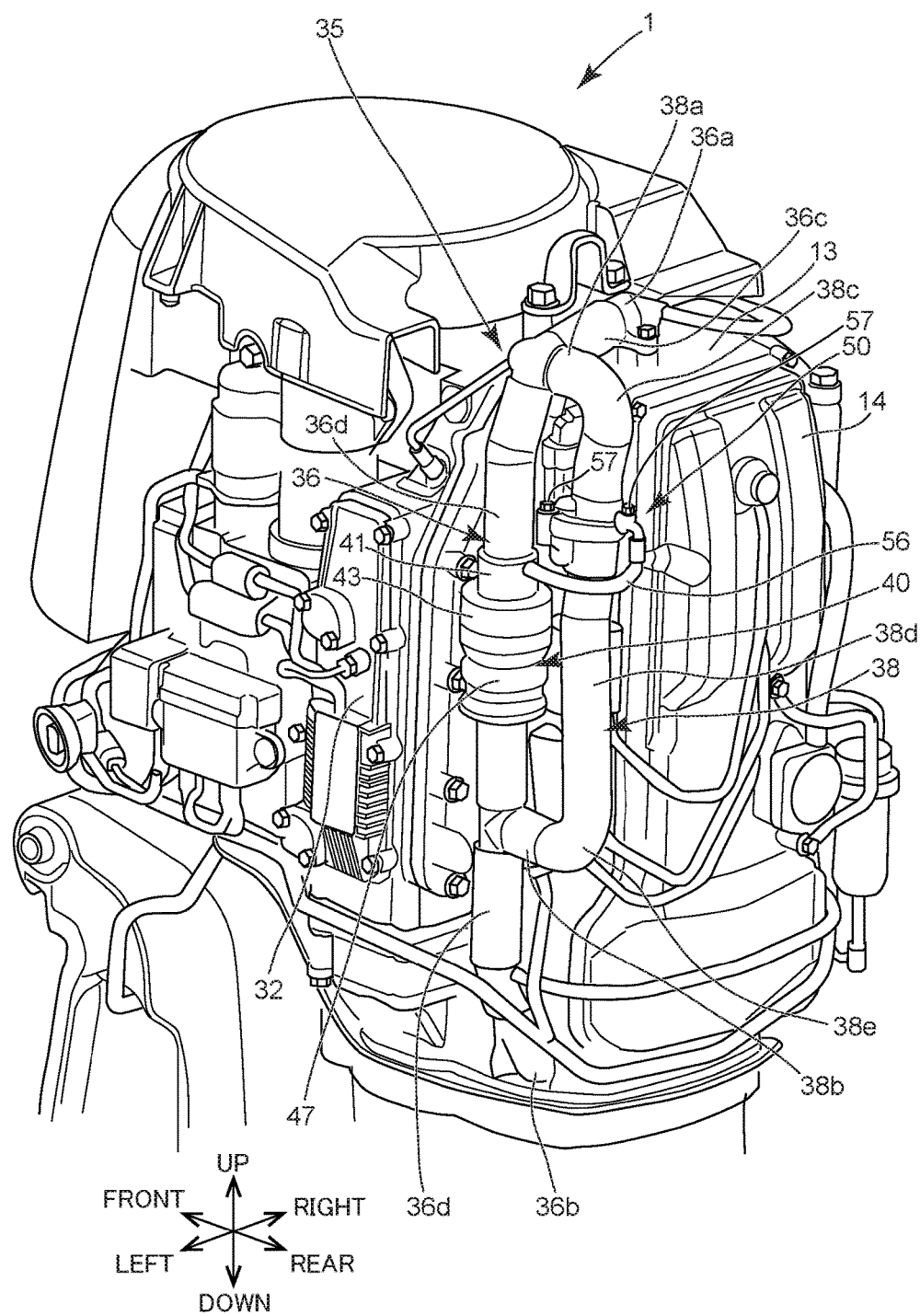
FIG. 1 is a perspective view of an engine and a cooling device for an outboard motor according to an embodiment.
Figure 2:
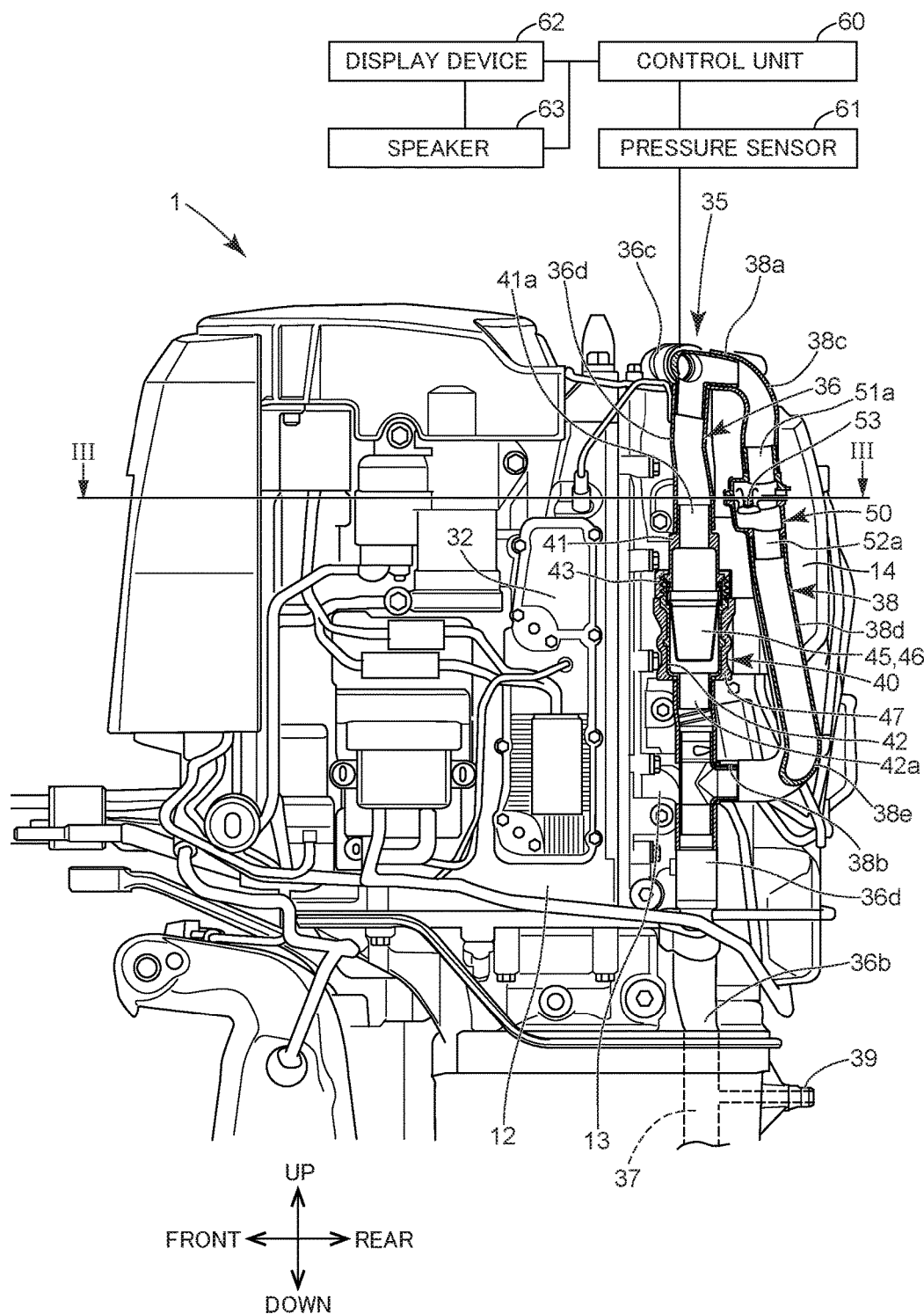
FIG. 2 is a side view illustrating, in a sectional view, a part of the cooling device in the engine and the cooling device for an outboard motor.

As illustrated in FIGS. 1 and 2, the water discharge-side water passage 35 includes a water discharge hose 36, a lower water discharge conduit line 37, and a bypass conduit line 38. In the engine room, the water discharge hose 36 configures a main water passage (first water passage) through which the cooling water generally flows, and a filtration device 40 is disposed at a midpoint of the water discharge hose 36. The bypass conduit line 38 is branched from the water discharge hose 36 and configures a water passage (second water passage) for detour that does not pass through the filtration device 40. Each of the water discharge hose 36 and the bypass conduit line 38 is formed using a flexible material. An upstream-side end portion 36a, which is one end of the water discharge hose 36, is connected to the cooling water passage 30 on the upper surface side of the cylinder block 12. A downstream-side end portion 36b, which is the other end of the water discharge hose 36, is connected to the lower water discharge conduit line 37 on a side (left side) of the cylinder head 13 and the head cover 14. The lower water discharge conduit line 37 extends downward from the engine room.

The water discharge hose 36 includes an upper pipe portion 36c extending from the upstream-side end portion 36a to the obliquely left and rear side and an up-down direction pipe portion 36d bent from the upper pipe portion 36c and extending downward. The up-down direction pipe portion 36d passes on the left side of the cylinder head 13 (see FIG. 3).

More specifically, the exhaust manifold 22 located on the left side of the cylinder 15 has a diameter increasing at a portion where the catalyst 23 is incorporated, as illustrated in FIGS. 4 and 5. The intake manifold 21 sticks out on the right side on the opposite side of the exhaust manifold 22 and the catalyst 23 with the cylinders 15 interposed therebetween. Therefore, the engine 1 has the widest width in the left-right direction at a portion where the catalyst 23 and the intake manifold 21 are disposed on the left and right sides of the cylinders 15. The up-down direction pipe portion 36d of the water discharge hose 36 is disposed backward beyond the maximum width portion of the engine 1 and extends substantially in parallel with the exhaust manifold 22 at a position behind the exhaust manifold 22 and the catalyst 23, in particular.

The bypass conduit line 38 is connected to a midpoint of the water discharge hose 36. As described above, the bypass conduit line 38 forms a water passage for detour that does not pass through the filtration device 40. An upstream-side end portion 38a of the bypass conduit line 38 is connected to the water discharge hose 36 near the upper end of the up-down direction pipe portion 36d (near the boundary between the upper pipe portion 36c and the up-down direction pipe portion 36d), and the connecting location of the upstream-side end portion 38a is located upward beyond the filtration device 40. A downstream-side end portion 38b of the bypass conduit line 38 is connected to the water discharge hose 36 at a lower portion of the up-down direction pipe portion 36d, and the connecting location of the downstream-side end portion 38b is located downward beyond the filtration device 40. In other words, the bypass conduit line 38 is branched from the water discharge hose 36 on a further upstream side beyond the filtration device 40 and meets the water discharge hose 36 on a further downstream side beyond the filtration device 40.

The bypass conduit line 38 includes a bent portion 38c extending backward from the upstream-side end portion 38a and bent downward, an up-down direction pipe portion 38d extending downward from the bent portion 38c, and a bent portion 38e bent forward from the lower end of the up-down direction pipe portion 38d and reaching the downstream-side end portion 38b. Therefore, the bypass conduit line 38 is located behind the up-down direction pipe portion 36d of the water discharge hose 36, and the up-down direction pipe portion 38d extends substantially in parallel with the up-down direction pipe portion 36d.

As illustrated in FIGS. 3 and 5, the amount of projecting leftward at the location of the valve operating chamber 24 is smaller than the amount of projecting leftward at the locations of the exhaust port 20 and the cooling water passage 30 (particularly, the exhaust surrounding water passage 34) behind the exhaust manifold 22 and the catalyst 23. In a corresponding manner, a configuration in which the up-down direction pipe portion 38d of the bypass conduit line 38 located on a side (left side) of the valve operating chamber 24 is located further inward (right side) in the width direction of the engine 1 than the up-down direction pipe portion 36d of the water discharge hose 36 located on a side (left side) of the exhaust port 20 and the exhaust surrounding water passage 34 is employed. In other words, the bypass conduit line 38 is disposed behind the water discharge hose 36, and each of the water discharge hose 36 and the bypass conduit line 38 is further disposed to be as close to the main body portion of the engine 1 as possible in the left-right direction, such that the water discharge hose 36 and the bypass conduit line 38 are accommodated behind the exhaust manifold 22 and the catalyst 23 with satisfactory space efficiency.

A water discharge port (not illustrated) that is opened on the outer surface side of the outboard motor is formed on the most downstream side of the water discharge-side water passage 35. The water discharge port is provided at the lower unit (near the rear end portion of the propeller shaft or the like), and an end portion of the lower water discharge conduit line 37 is connected to the water discharge port.

A control valve (not illustrated) that is opened and closed in accordance with a change in water temperature of the cooling water is provided between the cooling water passage 30 and the water discharge-side water passage 35 (water discharge hose 36). In a state in which the cooling water temperature in the cooling water passage 30 is low, the control valve is closed, does not allow the water to be discharged on the side of the water discharge-side water passage 35, and causes the cooling water to circulate inside the cooling water passage 30. If the cooling water temperature in the cooling water passage 30 increases, the control valve is opened, discharges the water on the side of the water discharge-side water passage 35, and takes cooling water at a low temperature from the inlet-side water passage. The cooling water fed to the water discharge-side water passage 35 passes through the water discharge hose 36 (a bypass conduit line 38 in some cases) and the lower water discharge conduit line 37 and is discharged from the water discharge port to the outside (underwater). A part of the cooling water passing through the water discharge-side water passage 35 is released from a detection hole 39 (see FIGS. 2 and 4) provided at a midpoint (above the water level) of the lower water discharge conduit line 37, and a distribution condition of the cooling water through the cooling water route can be checked by observing the released state from the detection hole 39.

Since relatively large foreign matters such as pebbles and algae are blocked by the strainer provided at the water inlet port of the inlet-side water passage as described above, the cooling water flowing through the cooling water route is water from which foreign matters with such sizes that cause clogging of the cooling water route have been removed. The cooling device according to the present embodiment includes, in the cooling water route, the filtration device 40 for filtrating and collecting yet finer foreign matters (environment contaminating materials, in particular) remaining in the cooling water as an environmental measure, in addition to securing of such cooling performance (smooth distribution of the cooling water). The filtration device 40 is a cartridge-type unit as illustrated in detail in FIGS. 6 and 7 and can be attached to and detached from a midpoint of the up-down direction pipe portion 36d of the water discharge hose 36. The filtration device 40 incorporates an inner filter 45 and an outer filter 46 such as meshes or non-woven clothes that are finer than the strainer and can capture fine foreign matters remaining in the cooling water before the cooling water is discharged to the outside.

Figure 6:
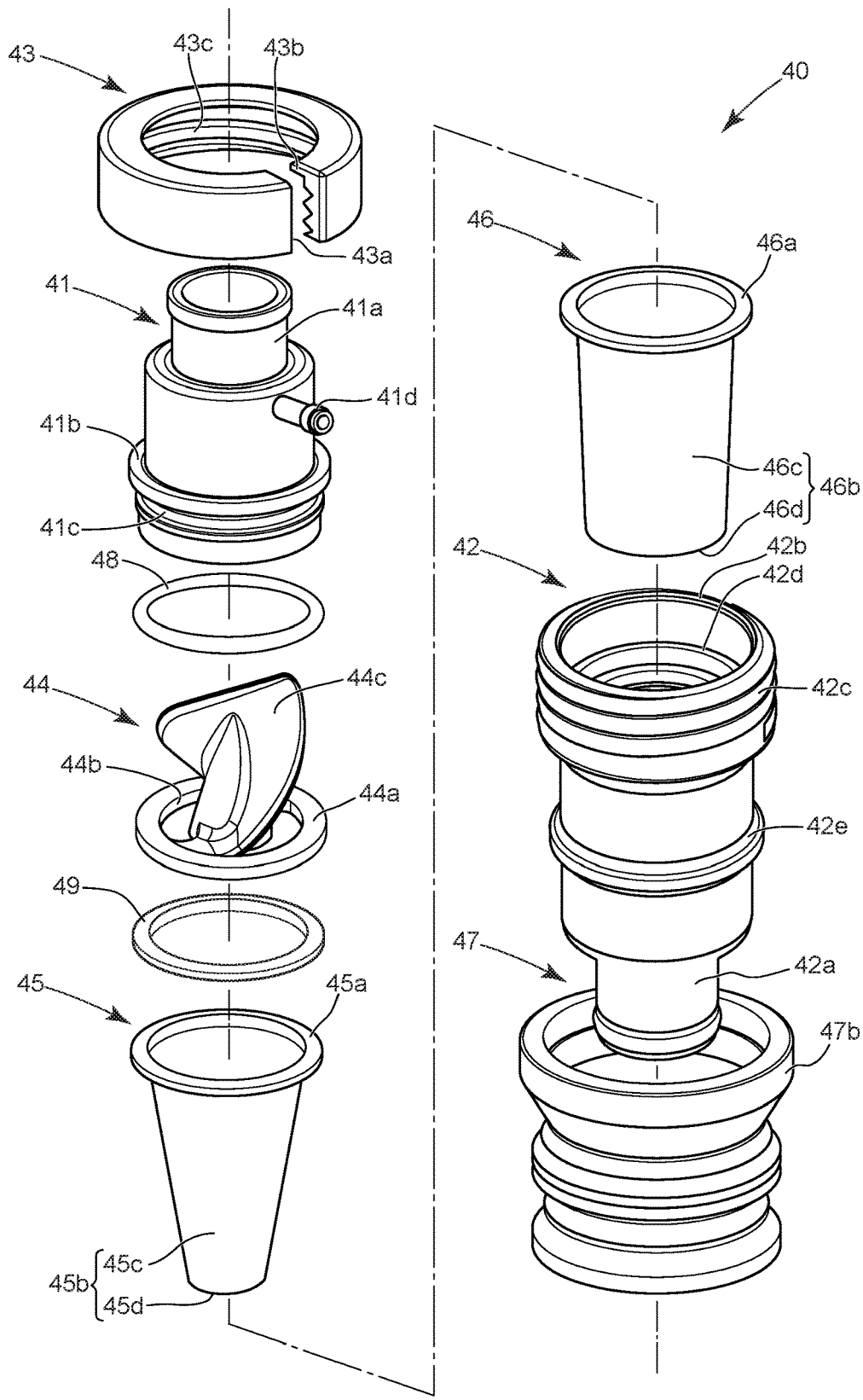
FIG. 6 is an exploded perspective view of a filtration device.
Figure 7:
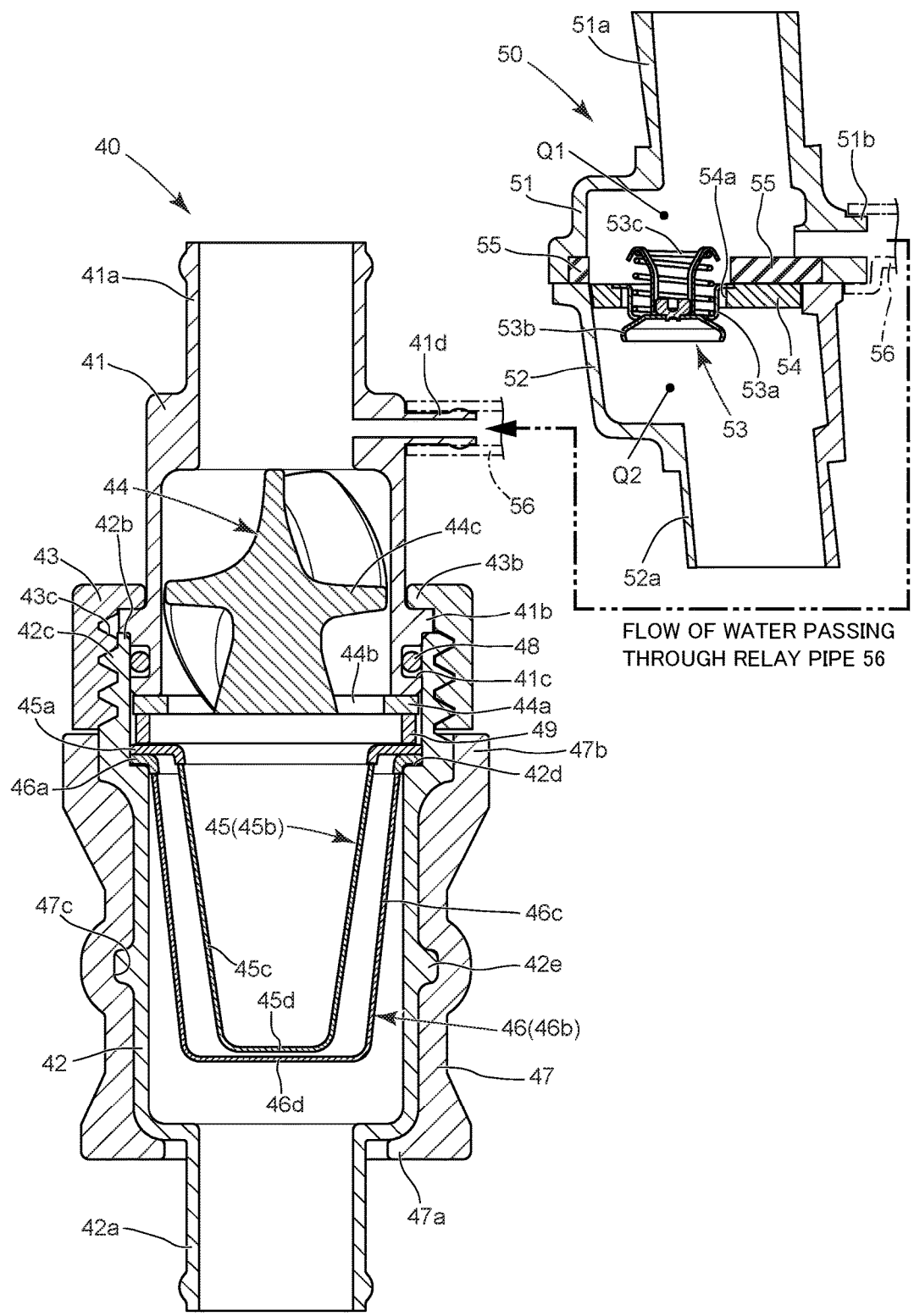
FIG. 7 is a sectional view of the filtration device and a valve unit.

Referring mainly to FIGS. 6 and 7, a specific configuration of the filtration device 40 will be described. The filtration device 40 has a tubular shape that is long in the up-down direction and includes an upper case 41 and a lower case 42 that are half case bodies that can be split into two in the up-down direction (the direction in which the cooling water flows). A cap 43 is included as a securing member that secures (couples) the upper case 41 and the lower case 42.

A swirling flow generation member 44 and the inner filter 45 and the outer filter 46 for filtration are supported inside the upper case 41 and the lower case 42. A cushion member 47 is attached to the outside of the lower case 42. Each of the upper case 41, the lower case 42, the cap 43, and the swirling flow generation member 44 is formed using metal, synthetic resin, or the like and has corrosion resistance against seawater. The cushion member 47 is made of an elastic body such as rubber.

The upper case 41 is a cylindrical member with an inner space penetrating in the up-down direction, and an entrance tubular portion 41a projecting upward is provided at an upper end thereof. At an outer peripheral portion of the upper case 41 below the entrance tubular portion 41a, a flange portion 41b projecting laterally from the outer surface and an annular groove 41c located below the flange portion 41b are formed. An O ring 48 made of an impermeable elastic body is attached to the annular groove 41c. A bypass connecting tube 41d penetrating laterally projects from a location slightly below the entrance tubular portion 41a.

The lower case 42 is a cylindrical member with an inner space penetrating in the up-down direction, and an exit tubular portion 42a projecting downward is provided at a lower end thereof. An enlarged diameter portion 42b with an enlarged inner diameter size is formed on the upper end side of the lower case 42, and a male screw 42c is formed on the outer surface of the enlarged diameter portion 42b. A stepped portion 42d that is an annular surface oriented upward is formed inside the enlarged diameter portion 42b. An annular fitting rib 42e projecting laterally is formed on the outer surface of the lower case 42 below the enlarged diameter portion 42b.

The lower end portion of the upper case 41 has an outer diameter with which the lower end portion can be inserted into the enlarged diameter portion 42b of the lower case 42 and does not advance downward beyond the enlarged diameter portion 42b (does not pass through the stepped portion 42d). The outer diameter of the flange portion 41b of the upper case 41 is larger than the inner diameter of the enlarged diameter portion 42b such that the flange portion 41b is not inserted into the enlarged diameter portion 42b.

The cap 43 is an annular member with a C shape in a plan view, and a part thereof in the circumferential direction is opened as a slit 43a. The slit 43a has a width with which the bypass connecting tube 41d of the upper case 41 can pass therethrough in the up-down direction. An annular pressing portion 43b that projects inward to reduce the opening diameter of the cap 43 is formed at the upper end portion of the cap 43. A female screw 43c to be screwed onto the male screw 42c of the lower case 42 is formed in the inner surface of the cap 43 located downward beyond the pressing portion 43b.

The swirling flow generation member 44 includes an annular seating portion 44a that has a penetrating portion 44b penetrating in the up-down direction inside the annular seating portion 44a and a blade portion 44c projecting upward from the seating portion 44a. The outer diameter of the seating portion 44a corresponds to the inner diameter of the enlarged diameter portion 42b of the lower case 42, such that the seating portion 44a does not enter the lower case 42 downward beyond the enlarged diameter portion 42b (does not pass through the stepped portion 42d). The blade portion 44c includes a twisted-shaped surface with positions thereof in the up-down direction and the radial direction changing toward the circumferential direction of the seating portion 44a.

Annular flange portions 45a and 46a projecting laterally are provided at upper ends of the inner filter 45 and the outer filter 46, respectively. The outer diameter of the flange portion 45a and the outer diameter of the flange portion 46a correspond to the inner diameter of the enlarged diameter portion 42b of the lower case 42 such that the flange portions 45a and 46a are placed on the stepped portion 42d without passing through the stepped portion 42d. Bursiform-shaped (bottomed truncated cone shape) capturing units 45b and 46b are provided at lower portions of the flange portions 45a and 46a of the filters 45 and 46, respectively. The capturing units 45b and 46b are configured with side walls 45c and 46c extending in the up-down direction and having upper ends connected to the flange portions 45a and 46a and bottom walls 45d and 46d shielding lower ends of the side walls 45c and 46c.

The capturing units 45b and 46b of the filters 45 and 46 have shapes with inner areas surrounded by the side walls 45c and 46c gradually decreasing from the side of upper ends connected to the flange portions 45a and 46a toward the side of lower ends connected to the bottom walls 45d and 46d, respectively. In other words, the side walls 45c and 46c have shapes like side surfaces of cones. The side wall 45c of the inner filter 45 and the side wall 46c of the outer filter 46 have mutually different inclinations relative to the up-down direction, and the side wall 45c has a larger inclination angle than the side wall 46c. Also, the diameter of the side wall 45c is smaller than the diameter of the side wall 46c at locations with the maximum diameters connected to the flange portions 45a and 46a. Further, the length from the flange portion 46a to the bottom wall 46d in the up-down direction is set to be equal to or greater than the length from the flange portion 45a to the bottom wall 45d in the up-down direction. Therefore, the capturing unit 45b is located inside the capturing unit 46b and there are gaps between the side wall 45c and the side wall 46c and between the bottom wall 45d and the bottom wall 46d in a state in which the flange portion 45a and the flange portion 46a are overlapped in the up-down direction as illustrated in FIG. 7.

Both the capturing unit 45b and the capturing unit 46b are made of mesh materials, non-woven clothes, or the like in which multiple finer pores than those in the strainer provided at the water inlet port of the inlet-side water passage are formed. The capturing unit 45b and the capturing unit 46b have different mesh sizes, the capturing unit 45b has a rougher mesh (larger pores), and the capturing unit 46b has a finer mesh (smaller pores).

The cushion member 47 is a tubular member with an inner space penetrating in the up-down direction and has a dimension with which the cushion member 47 surrounds the outside of the lower case 42 (fits the outer surface of the lower case 42). A restricting portion 47a that projects inward and reduces the opening diameter of the cushion member 47 is formed at the lower end portion of the cushion member 47. An enlarged diameter portion 47b with an inner diameter corresponding to the outer diameter of the enlarged diameter portion 42b of the lower case 42 is formed on the upper end side of the cushion member 47. An annular fitting recessed portion 47c to be fitted to the fitting rib 42e of the lower case 42 is formed in the inner surface of the cushion member 47 between the restricting portion 47a and the enlarged diameter portion 47b.

The filtration device 40 is assembled as follows. First, the inner filter 45 and the outer filter 46 are assembled inside the lower case 42 in a state in which the upper case 41 and the lower case 42 are split. If the outer filter 46 is inserted into the lower case 42 from the upper end side of the lower case 42 with the bottom wall 46d located at a head, further insertion of the outer filter 46 is limited by abutting of the flange portion 46a on the stepped portion 42d. Then, if the inner filter 45 is inserted into the lower case 42 from the upper end side of the lower case 42 with the bottom wall 45d located at a head, further insertion of the inner filter 45 is limited by the flange portion 45a overlapping on the flange portion 46a. In other words, the positions of the inner filter 45 and the outer filter 46 in the up-down direction are set via the stepped portion 42d. Furthermore, the positions of the inner filter 45 and the outer filter 46 in the front-back direction and the left-right direction are set by the outer peripheral portions of the flange portion 45a and the flange portion 46a coming into contact with the inner surface of the enlarged diameter portion 42b.

In this state, capturing unit 45b and the capturing unit 46b are located in the inner space of the lower case 42 further downward beyond the enlarged diameter portion 42b. As illustrated in FIG. 7, a gap is formed by the inclined shape of the side wall 46c between the inner surface of the lower case 42 and the side wall 46c of the outer filter 46. The gap becomes wider toward the lower side. In addition, a gap is also formed between the side wall 45c of the inner filter 45 and the side wall 46c of the outer filter 46. The bottom wall 46d of the outer filter 46 is located to be separate upward from the bottom portion of the lower case 42 (base end portion of the exit tubular portion 42a). The bottom wall 45d of the inner filter 45 is located with a slight gap above the bottom wall 46d. In other words, the inner space of the lower case 42 located downward beyond the enlarged diameter portion 42b is sectioned into three spaces, namely the space inside the capturing unit 45b, the space between the capturing unit 45b and the capturing unit 46b, and the space outside the capturing unit 46b (between the inner surface of the lower case 42 and the capturing unit 46b).

Next, a spacer 49 (see FIG. 7) is inserted from the upper side into the enlarged diameter portion 42b of the lower case 42. The spacer 49 is an annular member with a diameter corresponding to the flange portion 45a and the flange portion 46a and abuts from the upper side on the flange portion 45a overlapping on the flange portion 46a. The inside of the spacer 49 penetrates in the up-down direction. The spacer 49 has flexibility.

Next, the swirling flow generation member 44 is inserted from the upper side into the enlarged diameter portion 42b of the lower case 42. The lower surface of the seating portion 44a abuts on the spacer 49, and the position of the swirling flow generation member 44 in the up-down direction is thus set. The positions of the swirling flow generation member 44 in the front-back direction and the left-right direction are set by the outer peripheral portion of the seating portion 44a coming into contact with the inner surface of the enlarged diameter portion 42b.

Note that each member (the swirling flow generation member 44, the inner filter 45, the outer filter 46, and the spacer 49) to be inserted into the enlarged diameter portion 42b of the lower case 42 may not be sequentially and individually inserted, and a plurality of members may be inserted together. For example, the flange portion 45a and the flange portion 46a may be overlapped on each other in advance, and the inner filter 45 and the outer filter 46 may then be inserted into the lower case 42 together. Further, the components may be inserted into the lower case 42 in a form in which the spacer 49 and the swirling flow generation member 44 are also included in addition to the inner filter 45 and the outer filter 46.

Next, the upper case 41 is inserted from the upper side into the enlarged diameter portion 42b of the lower case 42. Prior to the insertion, the O ring 48 is attached to the annular groove 41c. If the lower surface of the flange portion 41b abuts on the upper end surface of the lower case 42 (enlarged diameter portion 42b), further insertion of the upper case 41 is limited. In this state, the lower end of the upper case 41 inserted into the enlarged diameter portion 42b abuts on the upper surface of the seating portion 44a, and the seating portion 44a, the spacer 49, the flange portion 45a, and the flange portion 46a are sandwiched between the lower end surface of the upper case 41 and the stepped portion 42d. The outer peripheral portion of the upper case 41 is restricted by the inner surface of the enlarged diameter portion 42b, the positions of the upper case 41 in the front-back direction and the left-right direction (the direction vertical to the center axis of the lower case 42) are set, and the entrance tubular portion 41a and the exit tubular portion 42a are coaxially located. Watertight shielding is achieved between the outer surface of the upper case 41 and the inner surface of the lower case 42 (enlarged diameter portion 42b) by the O ring 48 pressed into the inner surface of the enlarged diameter portion 42b and compression-deformed therein.

Next, the cap 43 is inserted downward from the upper end side of the upper case 41. At this time, the slit 43a and the bypass connecting tube 41d are positioned in the circumferential direction of the upper case 41, such that the slit 43a passes through the bypass connecting tube 41d. Then, the female screw 43c is screwed onto the male screw 42c, and the cap 43 is caused to rotate in the fastening direction. The cap 43 can be rotated in a manual operation. If a predetermined torque is applied to the cap 43 in the fastening direction in a state in which the pressing portion 43b abuts on the upper surface of the flange portion 41b, the flange portion 41b is sandwiched and held between the upper end surface of the enlarged diameter portion 42b and the lower surface of the pressing portion 43b, and a state in which the upper case 41 is secured to the lower case 42 is achieved. The swirling flow generation member 44, the inner filter 45, the outer filter 46, and the spacer 49 to be sandwiched between the lower end surface of the upper case 41 and the stepped portion 42d are also secured with the securing of the upper case 41. Setting is made such that precision errors between components are absorbed and the flange portion 45a and the flange portion 46a are reliably pressed against the stepped portion 42d, by the flexible spacer 49 being slightly compressed in the up-down direction at this time.

The cushion member 47 is attached from the lower side to the lower case 42. The cushion member 47 is inserted up to a position at which the restricting portion 47a abuts on the bottom portion (base end portion of the exit tubular portion 42a) of the lower case 42. In this state, the fitting recessed portion 47c is fitted to the fitting rib 42e, and dropping of the cushion member 47 downward from the lower case 42 is restricted. Also, the enlarged diameter portion 47b covers a part of the enlarged diameter portion 42b from the outside, and the upper end surface of the enlarged diameter portion 47b and the lower end surface of the cap 43 approach each other and are brought into a facing relationship. In other words, the cap 43 and the cushion member 47 cover the outside of a most part of the lower case 42 except for the exit tubular portion 42a and the male screw 42c.

Note that the attachment of the cushion member 47 to the lower case 42 may be performed after attachment of each of other members to the lower case 42 or may be performed before the attachment of each of other members. Since the attachment position of the cushion member 47 is a position at which the cushion member 47 does not interfere with the cap 43 as illustrated in FIG. 7, attachment of each of other members is not prevented even if the cushion member 47 is attached to the lower case 42 before.

The filtration device 40 is completed through the aforementioned processes. As illustrated in FIG. 7, the filtration device 40 in the completed state has a structure that includes a flow path with the entrance tubular portion 41a located on the upstream side and with the exit tubular portion 42a located on the downstream side and holds the swirling flow generation member 44, the inner filter 45, and the outer filter 46 in the flow path. Since the securing with the cap 43 can be performed in a manual operation after each member is inserted into the lower case 42, it is possible to easily assemble the filtration device 40 without using special tools.

The outer diameter of the cushion member 47 is larger than all the outer diameter sizes of the upper case 41, the lower case 42, and the cap 43, and the cushion member 47 is brought into a state in which it projects furthest on the outer diameter side in a state in which the filtration device 40 is assembled.

The filtration device 40 configured by combining each component as described above is attached to a midpoint of the water discharge hose 36. The up-down direction pipe portion 36d of the water discharge hose 36 is split into an upper half portion located on the upstream side and a lower half portion located on the downstream side, and the filtration device 40 is attached between the upper half portion and the lower half portion of the up-down direction pipe portion 36d. The entrance tubular portion 41a is inserted into an end portion of the upper half portion of the up-down direction pipe portion 36d, and the exit tubular portion 42a is inserted into an end portion of the lower half portion of the up-down direction pipe portion 36d, thereby connecting the filtration device 40 to the water discharge hose 36. The connecting portions have recessed and projecting fitting shapes to prevent the entrance tubular portion 41a and the exit tubular portion 42a from dropping from the water discharge hose 36 through the fitting. Also, a watertightness is achieved at the connecting portions with a predetermined sealing structure.

The cooling water that has flowed into the filtration device 40 from the upper half portion of the up-down direction pipe portion 36d through the entrance tubular portion 41a forms a swirling flow (cyclone flow) advancing downward while swirling along the blade portion 44c of the swirling flow generation member 44, advances to an area where the inner filter 45 and the outer filter 46 are placed through the penetrating portion 44b and the opening portion of the spacer 49, passes through the capturing units 45b and 46b of the filters 45 and 46, and exit to the lower half portion of the up-down direction pipe portion 36d from the exit tubular portion 42a on the downstream side.

Foreign matters contained in the cooling water that has flowed into the filtration device 40 are captured by the capturing unit 45b of the inner filter 45 and the capturing unit 46b of the outer filter 46, are prevented from advancing to the downstream side, and are then stored in the filtration device 40. It is possible to guide the flow of the cooling water along the surfaces of the capturing unit 45b and the capturing unit 46b by the swirling flow generation member 44 causing a swirling flow of the cooling water and to enhance foreign matter capturing efficiency.

In the filtration device 40 according to the present embodiment, the inner filter 45 and the outer filter 46 have different mesh roughness (fineness), and the capturing unit 46b of the outer filter 46 has a finer mesh than the capturing unit 45b of the inner filter 45. Examples of the foreign matters remaining in the cooling water as targets to be collected by the filtration device 40 include microplastics, in particular. Plastic pieces and the like with sizes of 5 mm or less are generally called microplastics. The capturing unit 46b of the outer filter 46 that has a fine mesh has a filtration function capable of capturing and collecting yet finer remaining foreign matters with sizes in a minimum visually recognizable level (about 0.1 mm to 0.2 mm in general) and can reliably collect the microplastics. The capturing unit 45b of the inner filter 45 includes intermediate foreign matter capturing performance between the strainer at the water inlet port and the capturing unit 46b of the outer filter 46 and can collect relatively large foreign matters from among the foreign matters that have entered the cooling water route through the strainer.

For example, it is assumed that the mesh size of the strainer at the water inlet port is set such that passing of foreign matters with sizes of about 1 mm to 2 mm or more can be restricted in order to satisfy a condition that clogging is not to be caused inside the cooling water route. Although there is a likelihood that foreign matters smaller than the sizes enter the cooling water route through the mesh of the strainer, the risk of the foreign matters clogging inside the cooling water route is low, and there is thus no problem in terms of securing of cooling performance. However, if the fine foreign matters contained in the cooling water are released to the outside as they are without being collected, opportunities of collecting fine environment contaminating materials that cannot be captured by the strainer are missed.

In order to take advantage of such opportunities to carry out an environmental measure, the filtration device 40 capable of capturing the fine foreign matters that have entered the cooling water route without being captured by the strainer is provided in the cooling water route of the cooling device. It is thus possible to remove the fine environment contaminating materials such as microplastics contained in the cooling water taken from the state in a state in which the engine 1 is driven and to return the cooling water, from which the environment contaminating materials have been removed, to the outside. Although it is generally difficult to collect the fine environment contaminating materials dispersed in water, the filtration device 40 is configured to capture the fine environment contaminating materials using the flow of the cooling water taken from the outside by focusing on the characteristic of the cooling device for a power source for a ship propulsion device of repeatedly taking cooling water from the outside (cruising water area) and discharging the cooling water. It is thus possible to efficiently and actively carry out an environmental measure with no need of special operations or control other than ordinary circulation of the cooling water during cruising of the ship using the engine 1 as a power source.

In an outboard motor with a large output and a large displacement capacity, in particular, the flow amount of cooling water taken into the cooling water route increases to have high cooling performance. In one example, an outboard motor with an engine displacement of more than 4000 cc and in an output level of 300 PS has performance of causing about 100 liters of cooling water to flow per minute (6000 liters per hour). It is thus possible to perform processing of removing environment contaminating materials from a large amount of cooling water in every cruising, by including the filtration device 40 in the cooling water route.

The filtration device 40 is disposed at a midpoint of the water discharge-side water passage 35 in the cooling water route. In the cooling water route, the water temperature of the cooling water flowing through the water discharge-side water passage 35 after heat is removed from the engine 1 in the cooling water passage 30 is higher than the water temperature of the cooling water until reaching the cooling water passage 30 after being pumped up from the outside to the inlet-side water passage. Since viscosity of warm water is lower than that of cold water, it is easy to cause the cooling water to flow without resistance regardless of the inner filter 45 and the outer filter 46, by providing the filtration device 40 at the midpoint of the water discharge-side water passage 35 through which warm water flows. It is thus possible to efficiently capture the foreign matters such as microplastics.

Moreover, there is also a likelihood that trash and the like left inside the engine 1, in addition to the foreign matters originally contained in water from the outside of the outboard motor, is mixed in the cooling water passing through the water discharge-side water passage 35. Each of the filters 45 and 46 of the filtration device 40 can also capture such foreign matters mixed at midpoints of the cooling water route. Therefore, the filtration device 40 is preferably provided in the water discharge-side water passage 35 on the downstream side in view of collection of the foreign matters left inside the engine 1 as well.

The filtration device 40 can also collect substances in water other than microplastics. For example, aquafarmers who use fish cages can efficiently capture remaining feed and the like spread in water during aquafarming using the filtration device 40 and can contribute to prevention of marine contamination by cruising around the fish cages in a ship using the engine 1 as a power source.

The filtration device 40 has a two-layer structure of the inner filter 45 and the outer filter 46. The inner filter 45 with a rough mesh captures relatively large foreign matters contained in the cooling water, and the outer filter 46 with a fine mesh captures yet finer foreign matters that have passed through the inner filter 45. In this manner, it is possible to efficiently and reliably collect environment contaminating materials including microplastics. In addition, it is possible to enhance foreign matter capturing efficiency of the inner filter 45 and the outer filter 46 by changing the cooling water passing through the filtration device 40 into a swirling flow by the incorporated swirling flow generation member 44.

A valve unit 50 is provided at a midpoint of the bypass conduit line 38. As illustrated in FIG. 7, the valve unit 50 is configured to hold a relief valve 53 in a casing configured by combining an upper case 51 and a lower case 52.

The upper case 51 includes a flow-in space Q1 therein and is provided with an entrance tubular portion 51*a* projecting upward and a side pipe portion 51*b* projecting laterally. Each of the entrance tubular portion 51*a* and the side pipe portion 51*b* communicates with the flow-in space Q1. The lower end of the upper case 51 is opened.

The lower case 52 includes a discharge space Q2 therein and is provided with an exit tubular portion 52*a* communicating with the discharge space Q2 and projecting downward. The upper end of the lower case 52 is shielded by a lid portion 54, and an opening 54*a* penetrating in the up-down direction is formed in the lid portion 54. The lid portion 54 may be formed integrally with the lower case 52 or may be formed as a member separated from the lower case 52 and may then be attached to the lower case 52.

The relief valve 53 is attached to the lid portion 54. The relief valve 53 includes a casing 53*a* secured to the inside of the opening 54*a* and a valve body 53*b* that can move upward and downward relative to the casing 53*a*, and the valve body 53*b* is biased in a closing direction (the upper side in FIG. 7) by a compression spring 53*c*.

Mating surfaces of the lower end of the upper case 51 and the upper end of the lower case 52 are caused to abut on each other to combine the upper case 51 and the lower case 52. The upper case 51 and the lower case 52 are fastened and secured with a plurality of bolts 57 (see FIG. 1). A sealing member 55 is sandwiched between the mutual mating surfaces of the upper case 51 and the lower case 52, and watertight shielding is achieved between the upper case 51 and the lower case 52 by the sealing member 55.

The flow-in space Q1 in the upper case 51 and the discharge space Q2 in the lower case 52 are isolated from each other with the lid portion 54, and a communicating state between the flow-in space Q1 and the discharge space Q2 changes in response to opening and closing of the relief valve 53. The relief valve 53 is a constantly closed-type valve member that closes the valve body 53*b* using a bias force of the compression spring 53*c*, and the valve body 53*b* is closed and blocks the cooling water advancing from the flow-in space Q1 to the discharge space Q2 in a state in which the pressure (water pressure) in the flow-in space Q1 is equal to or less than a predetermined value. FIG. 7 illustrates a state in which the relief valve 53 is closed. If the pressure (water pressure) in the flow-in space Q1 increases to be greater than the predetermined value, the valve body 53*b* is pushed down against the bias force of the compression spring 53*c*, and the cooling water flows to the discharge space Q2.

The valve unit 50 configured as described above is attached to a midpoint of the bypass conduit line 38. The up-down direction pipe portion 38*d* of the bypass conduit line 38 is split into an upper half portion located on the upstream side and a lower half portion located on the downstream side, and the valve unit 50 is attached between the upper half portion and the lower half portion of the up-down direction pipe portion 38*d*. The entrance tubular portion 51*a* is inserted into an end portion of the upper half portion of the up-down direction pipe portion 38*d*, and the exit tubular portion 52*a* is inserted into an end portion of the lower half portion of the up-down direction pipe portion 38*d*, such that the valve unit 50 is connected to the bypass conduit line 38. Watertightness is achieved at the connecting portions with a predetermined sealing structure.

The bypass connecting tube 41*d* of the filtration device 40 and the side pipe portion 51*b* of the valve unit 50 are connected to each other with a relay pipe 56. The relay pipe 56 is for causing water left upward beyond the relief valve 53 in the bypass conduit line 38 and the valve unit 50 to flow to the side of the filtration device 40.

In a state in which the cooling water smoothly flows in the filtration device 40, the pressure (water pressure) in the flow-in space Q1 does not increase, and the constantly closed-type relief valve 53 is maintained in the closed state. Therefore, even if the cooling water enters the bypass conduit line 38, the cooling water is blocked by the valve unit 50 and does not advance on the downstream side beyond the relief valve 53. In a case in which the cooling water partially enters the valve unit 50, the cooling water flows down to the filtration device 40 via a relay water passage formed by the relay pipe 56. Therefore, a flow of the cooling water going around to the downstream side of the filtration device 40 through the bypass conduit line 38 is not generated, the entire amount of cooling water pass through each of the filters 45 and 46 of the filtration device 40, and the filtration device 40 does not miss the foreign matters to be collected.

If the amount of foreign matters captured by the inner filter 45 and the outer filter 46 increases, and clogging occurs in the filtration device 40, flowing of the cooling water in the water discharge hose 36 is disturbed. If the cooling water prevented from advancing due to clogging remains in the upper half portion of the up-down direction pipe portion 36*d* and reaches the position of the upstream-side end portion 38*a*, the cooling water starts to flow through the bypass conduit line 38. The pressure (water pressure) in the flow-in space Q1 increases due to the cooling water that has advanced to the valve unit 50 through the bypass conduit line 38. In a case in which the pressure in the flow-in space Q1 increases to be greater than a predetermined value, the valve body 53*b* is opened against the bias force of the compression spring 53*c*, and the cooling water starts to flow from the flow-in space Q1 to the discharge space Q2.

The cooling water that has flowed downward from the discharge space Q2 reaches the downstream-side end portion 38*b* of the bypass conduit line 38 and flows into the lower half portion of the up-down direction pipe portion 36*d* that the downstream-side end portion 38*b* meets. Since the meeting location is located downward beyond the filtration device 40, it is possible to discharge the cooling water to the lower water discharge conduit line 37 via the bypass conduit line 38 without being affected by clogging of the filtration device 40. In this manner, it is possible to automatically select the water discharge hose 36 and the bypass conduit line 38 in accordance with a situation regardless of the amount of foreign matters captured by each of the filters 45 and 46 of the filtration device 40, to cause the cooling water therethrough from the upstream side to the downstream side with no problems, and to prevent the cooling performance of the engine 1 from being degraded due to circulation defects of the cooling water.

The bypass conduit line 38 has a simple configuration including the up-down direction pipe portion 38d extending substantially in parallel with the up-down direction pipe portion 36d of the water discharge hose 36 and the upper and lower bent portions 38c and 38e bent forward from the up-down direction pipe portion 38d and connected to the up-down direction pipe portion 36d. The cooling water can thus smoothly pass through the bypass conduit line 38 with no disturbance. The bypass conduit line 38 with the simple structure can be obtained at low costs.

The filtration device 40 is located substantially coaxially (on a linear flow path oriented in the up-down direction) with the up-down direction pipe portion 36d of the water discharge hose 36. On the other hand, the bypass conduit line 38 is at a location offset backward from the up-down direction pipe portion 36d. Therefore, it is possible to efficiently cause the cooling water entering the water discharge-side water passage 35 to pass due to the linear route passing through the filtration device 40 in a state in which no clogging has occurred in each of the filters 45 and 46 of the filtration device 40.

Each of the capturing units 45b and 46b of the filters 45 and 46 has a shape narrowed such that an inner area surrounded by each of the side walls 45c and 46c decreases toward the lower side. Therefore, in a case in which captured foreign matters are sequentially accumulated from the side of the lower end (bottom walls 45d and 46d) inside the capturing units 45b and 46b, a gap through which the cooling water is caused to flow is secured between the inner surface of the lower case 42 and the capturing units 45b and 46b above the foreign matters, and clogging is thus unlikely to occur in each of the filters 45 and 46 of the filtration device 40. In other words, the cooling water is unlikely to be prevented from advancing in the filtration device 40 until a state in which most parts of the capturing units 45b and 46b are filled with the foreign matters is achieved, and it is thus possible to reduce the replacement frequency of each of the filters 45 and 46 and to efficiently capture foreign matters.

Occurrence of clogging in the filtration device 40 is detected by a pressure sensor 61 (schematically illustrated in FIG. 2) placed upstream beyond the filtration device 40 in the water discharge-side water passage 35, for example. Signals from the pressure sensor 61 are transmitted to a control unit 60 (schematically illustrated in FIG. 2) mounted in the outboard motor or the ship. If clogging occurs in the filtration device 40, the water pressure in the water discharge-side water passage 35 increases on a further upstream side beyond the filtration device 40.

Although the cooling performance does not deteriorate in the state in which clogging has occurred in the filtration device 40 since the flow of the cooling water via the bypass conduit line 38 is secured, the water pressure temporarily rises on the upstream side of the filtration device 40 until the valve unit 50 opens the relief valve 53. The pressure sensor 61 can detect the influence of the rise of the water pressure.

In a case in which the detection value of the pressure sensor 61 is greater than a predetermined value, the control unit 60 determines that clogging has occurred in the filtration device 40 and causes an alert notification to be issued for the crew (ship operator). As a notification means, display (visual recognition) on a display device 62 such as a gauge for ship operating or a display light on an outer surface of the outboard motor or alert sound or voice generated from a speaker 63 is used. Also, a notification means other than these may be used. For example, a signal for notification may be transmitted to a mobile information terminal that the crew carries.

Note that an engine temperature alert based on a detection value of a water temperature sensor that measures the water temperature of the cooling water may be provided as a notification along with the clogging alert based on the detection value of the pressure sensor 61, in order to more reliably prevent overheating of the engine 1.

In a case in which a notification of clogging in the filtration device 40 is provided or a predetermined maintenance cycle has elapsed, the operator performs an operation of removing collected materials from the filtration device 40. It is possible to split the filtration device 40 by rotating the cap 43 in the loosening direction of the male screw 42c and the female screw 43c to remove the cap 43 and thereby releasing the securing between the upper case 41 and the lower case 42. In this manner, the swirling flow generation member 44, the inner filter 45, and the outer filter 46 incorporated in the filtration device 40 are exposed and can be pulled out. Then, each of the filters 45 and 46 is replaced, and the filtration device 40 is assembled again. For the replacement of each of the filters 45 and 46, each of the filters 45 and 46 from which the collected materials have been removed may be attached again, or new filters 45 and 46 may be attached instead. Alternatively, it is also possible to replace the entire filtration device 40 with a new filtration device 40.

The disassembly of the filtration device 40 can be achieved with the filtration device 40 connected to the water discharge hose 36. For example, it is possible to release the securing with the cap 43 to split the upper case 41 and the lower case 42 in a state in which the entrance tubular portion 41a is connected to the upper half portion of the up-down direction pipe portion 36d and the exit tubular portion 42a is connected to the lower half portion of the up-down direction pipe portion 36d.

Alternatively, maintenance including filter replacement may be performed after the filtration device 40 is detached from the water discharge hose 36. The filtration device 40 can be easily detached by pulling the entrance tubular portion 41a and the exit tubular portion 42a from the up-down direction pipe portion 36d.

In the valve unit 50, it is possible to perform maintenance or the like for the relief valve 53 by releasing the securing with a bolt 57 to split the upper case 51 and the lower case 52. The splitting of the upper case 51 and the lower case 52 can be achieved with the valve unit 50 connected to the bypass conduit line 38 (in a state in which the entrance tubular portion 51a is connected to the upper half portion of the up-down direction pipe portion 38d and the exit tubular portion 52a is connected to the lower half portion of the up-down direction pipe portion 38d). Alternatively, the maintenance may be performed in a state in which the entrance tubular portion 51a and the exit tubular portion 52a have been pulled out of from the up-down direction pipe portion 38d and the valve unit 50 has been detached from the bypass conduit line 38.

As illustrated in FIGS. 1 and 2, the valve unit 50 is located upward beyond the filtration device 40. If clogging of the filtration device 40 is solved and the cooling water starts to flow via the water discharge hose 36, the pressure in the flow-in space Q1 drops, the relief valve 53 is closed, and the cooling water thus stops to flow after (on the lower side of) the valve unit 50 in the bypass conduit line 38. Here, the water left upward beyond the relief valve 53 (between the upstream-side end portion 38a and the flow-in space Q1) in the bypass conduit line 38 drops into the upper case 41 of the filtration device 40 through the relay pipe 56 due to its gravity. It is thus possible to prevent a state in which water is continuously left at an upper portion of the bypass conduit line 38 when the bypass conduit line 38 is not used as a water passage for detour and to obtain effects of preventing corrosion of components and improving durability. Since the side pipe portion 51b to which the upstream-side end portion of the relay pipe 56 is connected communicates with the lowermost portion of the flow-in space Q1 as illustrated in FIG. 7, it is possible to reliably remove water from the portion located upward beyond the relief valve 53 in the bypass conduit line 38 and the valve unit 50.

The filtration device 40 is of a cartridge-type that incorporates the inner filter 45 and the outer filter 46. Therefore, it is possible to mount the filtration device 40 without applying any large-scaled modifications to the existing cooling device. Also, it is possible to easily perform maintenance operations such as filter replacement by disassembling the filtration device 40 or detaching and attaching only a portion of the filtration device 40, without requiring large-scaled disassembly of the cooling device.

The filtration device 40 as a unit can be easily detached from the engine 1 by pulling the entrance tubular portion 41a and the exit tubular portion 42a out of the up-down direction pipe portion 36d of the water discharge hose 36.

For the disassembly of the filtration device 40, securing between the upper case 41 and the lower case 42 is released through an operation of rotating the cap 43, and the inner filter 45 and the outer filter 46 can be easily pulled out of the lower case 42 in this state. The swirling flow generation member 44 can also be easily detached from the inside of the upper case 41. The releasing of securing with the cap 43 can be performed in a manual operation. Therefore, it is possible for the operator to easily perform detachment and replacement of each of the filters 45 and 46 and the swirling flow generation member 44 without any need of special tools, skills, and the like.

At the time of assembling the filtration device 40 after the maintenance, watertightness between the upper case 41 and the lower case 42 can be obtained by the O ring 48 by fastening the cap 43 to secure the cap 43 to the upper case 41 and the lower case 42. The swirling flow generation member 44, the inner filter 45, and the outer filter 46 are secured with the seating portion 44a, the flange portion 45a, the flange portion 46a, and the spacer 49 sandwiched between the lower end portion of the upper case 41 and the stepped portion 42d of the lower case 42. Therefore, it is possible to obtain a watertight structure for the filtration device 40 and to complete the securing between the swirling flow generation member 44 and each of the filters 45 and 46 merely by securing the upper case 41 and the lower case 42 using the cap 43, and thereby to assemble the filtration device 40 of the cartridge-type with no time and efforts.

As described above, it is possible to perform an environmental measure activity during an ordinary operation of the engine 1 by including the filtration device 40 in the cooling water route. Since the bypass conduit line 38 branched from the water discharge hose 36 on the upstream side beyond the filtration device 40 is provided and the valve unit 50 is included at the midpoint of the bypass conduit line 38, the flow of the cooling water is not prevented even in a situation in which clogging has occurred in the inner filter 45 and the outer filter 46 on the side of the filtration device 40, and power performance of the engine 1 is not sacrificed. Also, since it is only necessary to provide a cartridge-type filtration device 40 that has a simple configuration and can be easily maintained and the bypass conduit line 38 with the valve unit 50 without any addition of complicated devices, it is possible to realize an environmental measure activity at low costs while keeping the cooling device small in size.

The filtration device 40 has a tubular shape that is continuous with the up-down direction pipe portion 36d of the water discharge hose 36 and requires only a small space for placement. In an inner structure of the filtration device 40, the swirling flow generation member 44, the inner filter 45, and the outer filter 46 are aligned in the up-down direction, and an increase in outer diameter size is curbed by providing the filtration device 40 with an elongated shape in the up-down direction. The inner filter 45 and the outer filter 46 accommodate the capturing unit 45b inside the capturing unit 46b and achieve a satisfactory balance between the small sizes and the high performance of capturing foreign matters with the two-layer structure.

The outer peripheral portion of the filtration device 40 is covered with the cushion member 47. Since the cushion member 47 comes into contact with a surrounding structure and absorbs impact in a case in which the water discharge hose 36 swings due to vibration or the like, it is possible to protect both the filtration device 40 and the surrounding structure and to curb generation of abnormal noise due to the collision.

As illustrated in FIGS. 3 and 5, the engine 1 has a large width in the left-right direction near the center thereof in the front-back direction where the cylinder 15, the exhaust manifold 22, the catalyst 23, and the like are formed. In particular, since the catalyst 23 has a large volume, and the exhaust surrounding water passage 34 of the cooling water passage 30 surrounds the surroundings of the catalyst 23, as illustrated in FIG. 5, a large space is needed on the left side of the cylinder 15. Although the amount of engine 1 projecting on the left side is curbed as much as possible by forming the exhaust manifold 22 and the catalyst 23 into elongated shapes extending in the up-down direction, the portion near the catalyst 23 is a portion where the width of the engine 1 in the left-right direction reaches its maximum. On the other hand, in the region behind the catalyst 23, the engine 1 occupies a small width in the left-right direction.

The up-down direction pipe portion 36d of the water discharge-side water passage 35 is located behind the catalyst 23, is disposed a side (left side) of the exhaust port 20, and extends in the up-down direction. In accordance with this configuration, the filtration device 40 attached to the midpoint of the up-down direction pipe portion 36d is configured to have a tubular shape that is elongated in the up-down direction and is accommodated in a space with a stepped shape behind the catalyst 23. Highly density component disposition with no waste space is realized by disposing the catalyst 23 and the filtration device 40 that are elongated in the up-down direction in an aligned manner in the front-back direction. Therefore, the filtration device 40 is disposed with satisfactory space efficiency using the structures around the engine 1 including an exhaust system, and it is possible to secure the inner volume for collecting foreign matters while preventing an increase of the outboard motor in size.

Further, the bypass conduit line 38 and the valve unit 50 are disposed behind the up-down direction pipe portion 36d of the water discharge hose 36 and the filtration device 40. Since the bypass conduit line 38 and the valve unit 50 provided separately from the filtration device 40 have the function of causing the cooling water to detour in a case in which clogging occurs in the filtration device 40, it is possible to provide a small-sized (small-diameter) configuration specialized for the function of collecting foreign matters to the filtration device 40 and to enhance a degree of freedom in placement. The water passage for detour is configured with the bypass conduit line 38 and the valve unit 50 aligned with the up-down direction pipe portion 36d that is a main water passage, and it is thus possible to achieve space-saving disposition.

As illustrated in FIGS. 3 and 5, the bypass conduit line 38 and the valve unit 50 are accommodated in a space on a side (left side) of the valve operating chamber 24 behind the up-down direction pipe portion 36d and the filtration device 40. In this manner, the bypass conduit line 38 realizes disposition with excellent space efficiency while securing water discharge performance (the size of the conduit line diameter) equivalent to that of the water discharge hose 36.

Since the valve unit 50 is disposed with positional deviation from the filtration device 40 in the up-down direction, it is possible to cause the up-down direction pipe portion 36d of the water discharge hose 36 and the bypass conduit line 38 to approach one another in the front-back direction without allowing the filtration device 40 and the valve unit 50 to interfere with them (see FIGS. 2 and 4) and to reduce the entire water discharge-side water passage 35 in size in the front-back direction.

As a problem unique to the outboard motor, there is a requirement for reducing the lateral width of the outboard motor as much as possible on the assumption of a case in which multiple-machine arrangement in which a plurality of outboard motors are attached in an aligned manner is employed. The width of the engine portion is generally the widest in the outboard motor, in particular, and it is important to reduce the lateral width around the engine as much as possible. As illustrated in FIGS. 3 and 5, a shape with a width in the left-right direction gradually decreasing from the portion near the center of the outboard motor in the front-back direction toward the rear side is set for the engine case 2 in a manner corresponding to the engine 1 with a width in the left-right direction reaching its maximum at a location where the cylinder 15 and the catalyst 23 are provided. In this manner, the lateral width around the engine is minimized as a whole including not only the engine 1 but also the engine case 2.

As described above, the cooling device according to the present embodiment has a configuration in which the main water passage configured with the up-down direction pipe portion 36d and the water passage for detour configured with the bypass conduit line 38 are aligned in the front-back direction. In this manner, the width of the cooling device including the filtration device 40 in the left-right direction is curbed. Further, the bypass conduit line 38 is disposed with deviation toward the center (right side) of the outboard motor in the left-right direction as compared with the up-down direction pipe portion 36d in the cooling device. As illustrated in FIGS. 3 and 5, the amount of projecting on the left side of the outboard motor of the valve operating chamber 24 located on a side (right side) of the bypass conduit line 38 is smaller than those of the exhaust port 20 and the exhaust surrounding water passage 34 located on a side (right side) of the up-down direction pipe portion 36d. In a manner corresponding to this, the bypass conduit line 38 is disposed to be close to the center of the outboard motor.

With the aforementioned disposition, the up-down direction pipe portion 36, the filtration device 40, the bypass conduit line 38, and the valve unit 50 are accommodated in the space on the left and rear side of the engine 1 without affecting the narrowed shape of the engine case 2 (the outer surface shape of the outboard motor) with a width in the left-right direction decreasing on the rear side, that is, without increasing the outboard motor in size in the left-right direction.

Also, in the cooling device, the up-down direction pipe portion 36d and the filtration device 40 are disposed at positions on the front side near the exhaust port 20, the exhaust manifold 22, and the catalyst 23 through which exhaust gas at a high temperature passes, and the bypass conduit line 38 and the valve unit 50 are disposed at positions on the rear side that are relatively far from the heat source. As described above, the viscosity of the fluid decreases at a higher water temperature, and the cooling water more easily flows. Therefore, an effect of facilitating the flowing of the cooling water is obtained by disposing the up-down direction pipe portion 36d and the filtration device 40 on a side closer to the heat source to reduce the viscosity of the cooling water passing through the main water passage that incorporates the inner filter 45 and the outer filter 46.

Since a portion where the filtration device 40 is disposed in the front-back direction of the engine 1 has a wider width of the engine case 2 in the left-right direction than a portion where the bypass conduit line 38 is disposed, an effect of increasing the amount of collected foreign matters is also obtained by disposing the filtration device 40 in front of the bypass conduit line 38 to increase each of the filters 45 and 46 in size.

The cartridge-type filtration device 40 has a dedicated design in which filtration performance, space efficiency, disposition relationships with other components, and the like are optimized for each model of the power source for the ship propulsion device. Also, the cartridge-type filtration device 40 can be easily attached to and detached from the inside of the cooling water route.

The filtration device 40 and the valve unit 50 have small influences on the layout and functionality of the entire cooling device. For example, it is easy to mount the filtration device 40 and the valve unit 50 later on an existing cooling device with no filtration function provided therein.

FIGS. 8 and 9 illustrate a modification example of the cooling device. In the modification example, the same reference signs will be applied to locations common to those in the configuration described above in FIGS. 1 to 7, and description thereof will be omitted.

A water discharge-side water passage 70 includes a water discharge hose 71 that is a main water passage (first water passage) and a bypass conduit line 72 that is a water passage for detour (second water passage) branched from the water discharge hose 71. A filtration device 73 is provided at a midpoint of an up-down direction pipe portion 71a of the water discharge hose 71. The structure of the filtration device 73 is similar to that of the aforementioned filtration device 40. The bypass conduit line 72 is branched from the up-down direction pipe portion 71a on the upstream side beyond the filtration device 73 and meets the up-down direction pipe portion 71a on the downstream side beyond the filtration device 73. Although not illustrated, the bypass conduit line 72 is provided with a valve unit at a position located upward beyond the filtration device 73. The structure of the valve unit is similar to that of the aforementioned valve unit 50. Also, the filtration device 73 and the valve unit are connected to each other with a conduit line that is similar to the aforementioned relay pipe 56.

An exhaust conduit line 75 extending in the up-down direction is provided on the left side of cylinders 15, and a catalyst 76 is disposed inside the exhaust conduit line 75. The exhaust conduit line 75 is formed as a part of a cylinder block 12. The up-down direction pipe portion 71a of the water discharge hose 71, the filtration device 73, and the bypass conduit line 72 are disposed on a side opposite to the exhaust conduit line 75 and the catalyst 76 with the cylinders 15 interposed therebetween. More specifically, the up-down direction pipe portion 71a and the filtration device 73 are located on the front side, and the bypass conduit line 72 (and the valve unit) are located on the rear side, with these components disposed between the cylinder block 12 and an intake manifold 21.

The intake manifold 21 extends in the front-back direction along the inner surface (right side surface) of the engine case 2 and is bent leftward on the obliquely right and rear side of the cylinder block 12, and each branched pipe 21a is connected to an intake port 19 (see FIGS. 3 and 5). A space is formed between the right side surface of the cylinder block 12 and the intake manifold 21 due to the shape of the intake manifold 21. A configuration with excellent space efficiency can be realized by disposing components of the water discharge-side water passage 70 including the filtration device 73 in the space. It is possible to dispose the structure for collecting foreign matters including the water discharge hose 71 and the filtration device 73 and the structure for detour of the cooling water including the bypass conduit line 72 and the valve unit in a sorted manner in the narrow space between the cylinder block 12 and the intake manifold 21 by configuring the structures as separate members.

As illustrated in FIG. 9, a flywheel 77 that rotates along with a crankshaft 10 (see FIGS. 3 and 5) and a battery charge coil 78 located near the flywheel 77 are provided at an upper portion of the cylinder block 12. The battery charge coil 78 configures an electric power generator that generates electric power with rotation of the flywheel 77.

When the flywheel 77 and the battery charge coil 78 generate electric power, the battery charge coil 78 also generates heat. Air with a temperature raised due to the heat generation enters the space between the main body (cylinder block 12) of the engine 1 and the intake manifold 21 with the rotation of the flywheel 77. An effect of raising the water temperature of the cooling water passing through the water discharge hose 71 is obtained by disposing the components of the water discharge-side water passage 70 including the filtration device 73, and it becomes easy to cause the cooling water to flow without resistance through the filtration device 73 that incorporates filters 45 and 46.

In another modification example that is different from the configuration in FIGS. 8 and 9, it is also possible to dispose the bypass conduit line 72 at a location other than the location between the cylinder block 12 and the intake manifold 21. In one example, the bypass conduit line 72 may pass behind the branched pipes 21a of the intake manifold 21. It is possible to realize disposition with such a high degree of freedom by branching the two water passages, namely the main water passage and the water passage for detour.

As described above, the cooling device according to the present embodiment (including the modification examples) can collect environment contaminating materials such as microplastics and efficiently remove the environment contaminating materials without sacrificing power performance of the power source (engine 1) with a simple configuration. Also, it is possible to enhance a degree of freedom in designing and disposing the cooling device using the small-sized light-weight cartridge-type filtration device (40, 73), and the cooling device can thus be mounted in various types of ship propulsion devices.

Although the present invention has been described above on the basis of the embodiment, the present invention is not limited to the aforementioned embodiment and modification examples and can be implemented with various modifications. The sizes, the shapes, and the like illustrated in the accompanying drawings in the aforementioned embodiment are not limited thereto and can be appropriately modified within a scope in which the effects of the present invention are achieved. In addition, the present invention can be implemented with appropriate modifications without departing from the scope of the object of the present invention.

Although the aforementioned embodiment has been applied to the outboard motor as an example of the ship propulsion device, the target of application of the present invention is not limited to the outboard motor, and the present invention can be applied generally to ship propulsion devices including a type disposed inside a ship (hull).

Although the engine that is an internal combustion engine is used as a power source for a ship propulsion device (outboard motor) in the aforementioned embodiment, it is also possible to apply the present invention to a ship propulsion device including a power source of another type, such as an electric motor. In other words, the present invention can be applied to any ship propulsion device as long as cooling of a power source is performed by a water cooling-type cooling device.

Although foreign matters in a level that causes clogging of the cooling water route are removed by the strainer provided at the water inlet port of the cooling water route in the aforementioned embodiment, it is also possible to cause the water inlet port itself to have a porous structure of a set of small pores instead of the provision of the strainer.

Although the filtration device 40 incorporates the filters 45 and 46 in two-layer structure to enhance efficiency of collecting foreign matters in the aforementioned embodiment, it is also possible to use filters with a structure other than the two-layer structure.

Although the filtration device 40, 73 is provided at the midpoint of the water discharge-side water passage 35, 70 in the cooling water route in the aforementioned embodiment, it is also possible to provide a filtration device such as the filtration device 40 and 73 at a midpoint of the inlet-side water passage from the water inlet port to the cooling water passage 30 in the cooling water route.

In the aforementioned embodiment, the bypass conduit line 38, 72 (second water passage) is branched from the water discharge hose 36, 71 (first water passage) and then meets the water discharge hose 36, 71. Unlike this, it is also possible to configure the water discharge-side water passage such that the second water passage branched from the first water passage reaches the water discharge port without meeting the first water passage.

The cooling device for a power source for a ship propulsion device according to the present invention can collect environment contaminating materials such as microplastic that are present in water and efficiently remove the environment contaminating materials with a simple configuration with no sacrifice of power performance, and is particularly useful for a ship propulsion device with a high output that pumps a large amount of cooling water with the cooling device.

REFERENCE SIGNS LIST

1 Engine (power source)
2 Engine case
11 Crankcase
12 Cylinder block
13 Cylinder head
14 Head cover
15 Cylinder
16 Piston
18 Combustion chamber
19 Intake port
20 Exhaust port
21 Intake manifold (intake conduit line)
22 Exhaust manifold (exhaust conduit line)
23 Catalyst
24 Valve operating chamber
30 Cooling water passage
33 Cylinder surrounding water passage
34 Exhaust surrounding water passage
35 Water discharge-side water passage
36 Water discharge hose (first water passage)
36d Up-down direction pipe portion
37 Lower water discharge conduit line
38 Bypass conduit line (second water passage)
40 Filtration device
41 Upper case (case for filtration device)
42 Lower case (case for filtration device)
43 Cap (securing member)
44 Swirling flow generation member
45 Inner filter (filter)
45b Capturing unit
46 Outer filter (filter)
46b Capturing unit
47 Cushion member
50 Valve unit
51 Upper case
52 Lower case
53 Relief valve (valve member)
56 Relay pipe (relay water passage)
60 Control unit
61 Pressure sensor
62 Display device (notification means)
63 Speaker (notification means)
70 Water discharge-side water passage
71 Water discharge hose (first water passage)
71a Up-down direction pipe portion
72 Bypass conduit line (second water passage)
73 Filtration device
75 Exhaust conduit line
76 Catalyst

What is claimed is:

1. A cooling device for a power source for a ship propulsion device comprising:
   a cooling water route that supplies water pumped up from underwater to a cooling water passage to cool a power source and discharges cooling water after the cooling from the cooling water passage to outside, foreign matters with sizes that cause clogging of the cooling water route having been removed from the cooling water flowing through the cooling water route;
   a cartridge-type filtration device that is provided at a midpoint of a first water passage in the cooling water route and incorporates a filter for filtrating foreign matters remaining in the cooling water; and
   a second water passage that is branched from the first water passage and adapted such that a valve member is opened to cause the cooling water to flow in a case in which clogging occurs in the filter,
   wherein the filtration device includes a case that is able to be split in a direction in which the cooling water flows and a securing member that secures the case in an assembled state, the filter being able to be attached to and detached from the case in a split state.

2. The cooling device for a power source for a ship propulsion device according to claim 1,
   wherein in a case in which clogging occurs in the filter, a notification means provides a notification using display or sound.

3. The cooling device for a power source for a ship propulsion device according to claim 1,
   wherein the filtration device has a filtration function with which remaining foreign matters with minimum visible sizes are able to be captured by the filter.

4. The cooling device for a power source for a ship propulsion device according to claim 1,
   wherein the filtration device is provided at a midpoint of a water discharge-side water passage from the cooling water passage to a water discharge port in the cooling water route.

5. A cooling device for a power source for a ship propulsion device comprising:
   a cooling water route that supplies water pumped up from underwater to a cooling water passage to cool a power source and discharges cooling water after the cooling from the cooling water passage to outside foreign matters with sizes that cause clogging of the cooling water route having been removed from the cooling water flowing through the cooling water route;
   a cartridge-type filtration device that is provided at a midpoint of a first water passage in the cooling water route and incorporates a filter for filtrating foreign matters remaining in the cooling water; and
   a second water passage that is branched from the first water passage and adapted such that a valve member is opened to cause the cooling water to flow in a case in which clogging occurs in the filter,
   wherein the valve member is disposed upward beyond the filtration device, and the first water passage and the second water passage are caused to communicate with each other with a relay water passage above the valve member and above the filter, and
   wherein the relay water passage is connected to the second water passage at a position which is lower than the branch point of the first water passage and the second water passage.

6. A cooling device for a power source for a ship propulsion device comprising:
   a cooling water route that supplies water pumped up from underwater to a cooling water passage to cool a power source and discharges cooling water after the cooling from the cooling water passage to outside, foreign matters with sizes that cause clogging of the cooling water route having been removed from the cooling water flowing through the cooling water route;
   a cartridge-type filtration device that is provided at a midpoint of a first water passage in the cooling water route and incorporates a filter for filtrating foreign matters remaining in the cooling water; and
   a second water passage that is branched from the first water passage and adapted such that a valve member is opened to cause the cooling water to flow in a case in which clogging occurs in the filter, wherein the ship propulsion device is an outboard motor including the power source that is an internal combustion engine, wherein the internal combustion engine includes a cylinder, the cylinder is disposed at the center of the outboard motor in the left-right direction, wherein the internal combustion engine includes a catalyst that is provided in an exhaust conduit line thereof, wherein the catalyst is provided, in the left-right direction, on the side of the cylinder, wherein the filtration device is disposed behind the catalyst and is disposed, in the left-right direction, on the side of a cylinder head of the internal combustion engine, and wherein the second water passage is disposed behind the filtration device.

7. A cooling device for a power source for a ship propulsion device comprising:

a cooling water route that supplies water pumped up from underwater to a cooling water passage to cool a power source and discharges cooling water after the cooling from the cooling water passage to outside, foreign matters with sizes that cause clogging of the cooling water route having been removed from the cooling water flowing through the cooling water route;

a cartridge-type filtration device that is provided at a midpoint of a first water passage in the cooling water route and incorporates a filter for filtrating foreign matters remaining in the cooling water; and a second water passage that is branched from the first water passage and adapted such that a valve member is opened to cause the cooling water to flow in a case in which clogging occurs in the filter, wherein the ship propulsion device is an outboard motor including the power source that is an internal combustion engine, wherein the internal combustion engine includes a cylinder, the cylinder is disposed at the center of the outboard motor in the left-right direction, wherein the internal combustion engine includes an intake conduit line, the intake conduit line extends, in the front-back direction of the outboard motor, along the inner surface of an engine case of the outboard motor and is bent at rear side of a cylinder block of the internal combustion engine, and is connected to an intake port, and wherein the filtration device is disposed between the intake conduit line and the cylinder block.

8. A cooling device for a power source for a ship propulsion device comprising:

a cooling water route that supplies water pumped up from underwater to a cooling water passage to cool a power source and discharges cooling water after the cooling from the cooling water passage to outside foreign matters with sizes that cause clogging of the cooling water route having been removed from the cooling water flowing through the cooling water route;

a cartridge-type filtration device that is provided at a midpoint of a first water passage in the cooling water route and incorporates a filter for filtrating foreign matters remaining in the cooling water; and a second water passage that is branched from the first water passage and adapted such that a valve member is opened to cause the cooling water to flow in a case in which clogging occurs in the filter, wherein the filtration device includes a swirling flow generation member that causes a flow of the cooling water swirling along a surface of the filter to be generated, wherein the swirling flow generation member includes a blade portion that is formed in a twisted-shaped surface, a peripheral position of the twisted-shaped surface varies, in the up-down direction and the radial direction of the filtration device, along the circumferential direction thereof, and wherein the filter includes a capturing unit, and an inner cross-sectional area defined by a side wall thereof gradually decreases from the upper side toward the lower side in the up-down direction.

* * * * *